(12) United States Patent
Blodgett et al.

(10) Patent No.: US 11,133,075 B2
(45) Date of Patent: Sep. 28, 2021

(54) MANAGED NAND POWER MANAGEMENT

(71) Applicant: Micron Technology, Inc., Boise, ID (US)

(72) Inventors: Greg A. Blodgett, Nampa, ID (US); Sebastien Andre Jean, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 70 days.

(21) Appl. No.: 16/023,386

(22) Filed: Jun. 29, 2018

(65) Prior Publication Data

US 2019/0013079 A1    Jan. 10, 2019

Related U.S. Application Data

(60) Provisional application No. 62/653,382, filed on Apr. 5, 2018, provisional application No. 62/529,910, filed on Jul. 7, 2017.

(51) Int. Cl.
*G06F 3/06*     (2006.01)
*G06F 12/00*    (2006.01)
(Continued)

(52) U.S. Cl.
CPC ........ *G11C 16/3418* (2013.01); *G06F 1/3206* (2013.01); *G06F 1/3275* (2013.01); *G06F 3/0622* (2013.01); *G06F 9/30101* (2013.01); *G06F 9/321* (2013.01); *G06F 9/546* (2013.01); *G06F 12/0246* (2013.01); *G06F 12/1408* (2013.01); *G06F 12/1416* (2013.01); *G06F 12/1425* (2013.01); *G06F 12/1441* (2013.01); *G06F 12/1458* (2013.01); *G06F 12/1466* (2013.01); *G06F 21/79* (2013.01); (Continued)

(58) Field of Classification Search
CPC ............ G06F 12/1408; G06F 12/1441; G11C 16/0408; G11C 16/0483; G11C 16/3427
USPC ......................................................... 711/103
See application file for complete search history.

(56) References Cited

U.S. PATENT DOCUMENTS 5,212,778 A * 5/1993 Dally .................... G06F 15/167
                                                              711/200
5,835,950 A * 11/1998 Cho ..................... G06F 12/0815
                                                              711/144

(Continued)

OTHER PUBLICATIONS

U.S. Appl. No. 17/016,182, filed Sep. 9, 2020, Managed NAND Performance Throttling.

*Primary Examiner* — Mohamed M Gebril
(74) *Attorney, Agent, or Firm* — Schwegman Lundberg & Woessner, P.A.

(57) ABSTRACT

Apparatus and methods are disclosed including a memory device or a memory controller configured to receive, from a host device over a host interface, a request for a device descriptor of a memory device, and to send to the host, over the host interface, the device descriptor, the device descriptor including voltage supply capability fields that are set to indicate supported voltages of the memory device, the supported voltages selected from a plurality of discrete voltages. The host device can utilize the supported voltages to supply an appropriate voltage to the memory device. Methods of operation are disclosed, as well as machine-readable medium, a host computing device, and other embodiments.

13 Claims, 21 Drawing Sheets

(51) Int. Cl.
| | |
|---|---|
| G06F 13/00 | (2006.01) |
| G11C 16/34 | (2006.01) |
| G11C 16/04 | (2006.01) |
| G06F 1/3206 | (2019.01) |
| G11C 7/04 | (2006.01) |
| G06F 12/14 | (2006.01) |
| G06F 9/30 | (2018.01) |
| G06F 9/32 | (2018.01) |
| G06F 9/54 | (2006.01) |
| G06F 12/02 | (2006.01) |
| G06F 21/79 | (2013.01) |
| H04L 9/08 | (2006.01) |
| G06F 1/3234 | (2019.01) |
| G11C 16/10 | (2006.01) |

(52) U.S. Cl.
CPC ............ *G11C 7/04* (2013.01); *G11C 16/0408* (2013.01); *G11C 16/0483* (2013.01); *G11C 16/3427* (2013.01); *H04L 9/0861* (2013.01); *G11C 16/10* (2013.01); *G11C 16/3459* (2013.01); *G11C 2213/71* (2013.01)

(56) References Cited

U.S. PATENT DOCUMENTS

| | | | |
|---|---|---|---|
| 6,473,849 B1* | 10/2002 | Keller | G06F 13/1657 709/210 |
| 6,813,682 B2* | 11/2004 | Bress | G06F 3/0622 711/112 |
| 6,968,447 B1* | 11/2005 | Apisdorf | H04L 49/35 712/22 |
| 6,978,459 B1* | 12/2005 | Dennis | G06F 9/52 718/100 |
| 7,171,521 B2 | 1/2007 | Rowlands | G06F 12/084 711/141 |
| 9,760,311 B1 | 9/2017 | Amir et al. | |
| 10,042,762 B2* | 8/2018 | Jayasena | G06F 12/0815 |
| 10,175,667 B2 | 1/2019 | Bang et al. | |
| 10,418,115 B2 | 9/2019 | Blodgett et al. | |
| 10,790,032 B2 | 9/2020 | Blodgett et al. | |
| 10,916,316 B2 | 2/2021 | Blodgett et al. | |
| 2002/0165976 A1 | 11/2002 | Gonthier et al. | |
| 2004/0073755 A1* | 4/2004 | Webb, Jr. | G06F 12/0826 711/144 |
| 2004/0199727 A1* | 10/2004 | Narad | G06F 12/0862 711/138 |
| 2005/0066064 A1* | 3/2005 | Micheal | G06F 9/526 710/1 |
| 2005/0200998 A1* | 9/2005 | Rowan | H02M 3/1588 360/69 |
| 2006/0161740 A1* | 7/2006 | Kottapalli | G06F 9/3842 711/152 |
| 2007/0051806 A1* | 3/2007 | Fujimoto | G11C 5/143 235/441 |
| 2007/0079152 A1 | 4/2007 | Winick et al. | |
| 2007/0121699 A1 | 5/2007 | Johns et al. | |
| 2008/0163226 A1 | 7/2008 | Radhakrisnan et al. | |
| 2010/0191914 A1* | 7/2010 | Cantin | G06F 12/0811 711/122 |
| 2010/0250836 A1* | 9/2010 | Sokolov | G06F 13/28 711/103 |
| 2011/0173506 A1 | 7/2011 | Allen et al. | |
| 2012/0002498 A1* | 1/2012 | Matsushita | G11C 16/30 365/226 |
| 2012/0036334 A1* | 2/2012 | Horman | G06F 9/52 711/165 |
| 2012/0047319 A1 | 2/2012 | Yoon et al. | |
| 2012/0047320 A1 | 2/2012 | Yoo et al. | |
| 2012/0227045 A1* | 9/2012 | Knauth | G06F 9/3004 718/100 |
| 2013/0013882 A1* | 1/2013 | Fujimoto | G06F 3/061 711/170 |
| 2013/0070363 A1 | 3/2013 | Bennett et al. | |
| 2013/0073839 A1* | 3/2013 | Hasegawa | G06F 12/0804 713/2 |
| 2013/0254488 A1* | 9/2013 | Kaxiras | G06F 12/0815 711/130 |
| 2014/0032949 A1 | 1/2014 | Kim et al. | |
| 2014/0033217 A1* | 1/2014 | Vajda | G06F 9/30189 718/102 |
| 2014/0245030 A1* | 8/2014 | Helfrich | H02M 7/04 713/300 |
| 2014/0258637 A1* | 9/2014 | Hong | G06F 12/0808 711/135 |
| 2014/0281243 A1* | 9/2014 | Shalf | G06F 12/0842 711/122 |
| 2015/0032998 A1* | 1/2015 | Rajwar | G06F 9/3004 712/208 |
| 2015/0178199 A1* | 6/2015 | Wang | G06F 12/082 711/122 |
| 2015/0242143 A1* | 8/2015 | Kim | G11C 16/349 714/704 |
| 2015/0278094 A1* | 10/2015 | Ma | G06F 12/0811 711/122 |
| 2015/0286586 A1* | 10/2015 | Yadav | G06F 12/1466 711/152 |
| 2015/0347302 A1* | 12/2015 | Hagersten | G06F 12/0862 711/122 |
| 2016/0018884 A1 | 1/2016 | Schulz et al. | |
| 2016/0034397 A1* | 2/2016 | Lam | G06F 12/0817 711/119 |
| 2016/0154735 A1* | 6/2016 | Hwang | G06F 1/32 711/130 |
| 2016/0246641 A1* | 8/2016 | Kogan | G06F 3/0629 |
| 2016/0254812 A1* | 9/2016 | Miwa | H03K 19/0005 326/30 |
| 2017/0017412 A1* | 1/2017 | Luan | G06F 13/1663 |
| 2017/0052551 A1 | 2/2017 | Bang et al. | |
| 2017/0068545 A1* | 3/2017 | Nowak | G06F 9/30185 |
| 2017/0090977 A1* | 3/2017 | Bradbury | G06F 12/0808 |
| 2017/0185518 A1* | 6/2017 | Guim Bernet | G06F 12/084 |
| 2017/0220474 A1* | 8/2017 | Dice | G06F 9/52 |
| 2017/0285976 A1* | 10/2017 | Durham | G06F 12/1408 |
| 2017/0286310 A1* | 10/2017 | Sukhomlinov | G06F 12/0811 |
| 2017/0286329 A1* | 10/2017 | Fernando | G06F 13/1663 |
| 2018/0088854 A1* | 3/2018 | Noh | G06F 3/0634 |
| 2018/0089083 A1* | 3/2018 | Deshpande | G06F 12/0831 |
| 2018/0239702 A1* | 8/2018 | Farmahini Farahani | G06F 12/0837 |
| 2019/0013079 A1* | 1/2019 | Blodgett | G11C 16/3427 |
| 2019/0013081 A1 | 1/2019 | Blodgett et al. | |
| 2019/0057173 A1* | 2/2019 | Ventroux | G06F 30/33 |
| 2020/0043559 A1 | 2/2020 | Blodgett et al. | |
| 2020/0411123 A1 | 12/2020 | Blodgett et al. | |

\* cited by examiner

| VCC SUPPLY CAPABILITY | | |
|---|---|---|
| BITT[15:2] | BITT[1] | BITT[0] |
| RESERVED | 3.3V | 2.5V |

*FIG. 2*

| VCCQ SUPPLY CAPABILITY | |
|---|---|
| BIT[0] | 1.2V |
| BIT[15:1] | RESERVED |

| VCCQ2 SUPPLY CAPABILITY | |
|---|---|
| BIT[0] | 1.8V |
| BIT[15:1] | RESERVED |

*FIG. 3*

| OFFSET | SIZE | NAME | MDV | USER CONF | DESCRIPTION |
|---|---|---|---|---|---|
| | | | | | DEVICE DESCRIPTOR |
| 31h | 3 | SUPPLY_USAGE | DEVICE SPECIFIC | NO | DEVICE SUPPLY USAGE<br>BYTE 0<br>  0h = RESERVED<br>  1h = 2.5V VCC COMPATIBLE<br>  2h = 3.3V VCC COMPATIBLE<br>  3h = EITHER 2.5V OR 3.3V COMPATIBLE<br>  OTHER VALUES RESERVED<br>BYTE 1<br>  0h = VCCQ NOT USED BY THIS DEVICE<br>  1h = 1.2V NOMINAL VCCQ IS USED BY THIS DEVICE<br>  OTHER VALUES RESERVED<br>BYTE 2<br>  0h = VCCQ2 NOT USED BY THIS DEVICE<br>  1h = 1.8V NOMINAL VCCQ2 IS USED BY THIS DEVICE<br>  OTHER VALUES RESERVED |

*FIG. 4*

| RESULT STRUCTURE | BIT[15:12] | BIT[11:8] | BIT[7] | BIT[6:0] |
|---|---|---|---|---|
| 500 | RESERVED | RESERVED | WRITE COUNTER STATUS | OPERATION STATUS |

| RESULT STRUCTURE | BIT[15:12] | BIT[11:8] | BIT[7] | BIT[6:0] |
|---|---|---|---|---|
| 510 | IID | RESERVED | WRITE COUNTER STATUS | OPERATION STATUS |

*FIG. 5*

MANAGED NAND POWER MANAGEMENT

PRIORITY CLAIM

This patent application claims the benefit of priority under 35 U.S.C. Section 119 to U.S. Provisional Patent Application Ser. No. 62/529,910, titled "UFS 3.0 Improvements", filed on Jul. 7, 2017 to Blodgett et al., and to U.S. Provisional Patent Application Ser. No. 62/653,382, titled "UFS 3.0 Improvements", filed on Apr. 5, 2018 to Blodgett et al., each of which incorporated by reference herein in its entirety.

BACKGROUND

Memory devices are typically provided as internal semiconductor integrated circuits in computers or other electronic devices. There are many different types of memory, including volatile and non-volatile memory. Volatile memory requires power to maintain its data, and includes random-access memory (RAM), dynamic random access memory (DRAM), or synchronous dynamic random access memory (SDRAM), among others. Non-volatile memory (storage devices) can retain stored data when not powered, and includes flash memory, read-only memory (ROM), electrically erasable programmable ROM (EEPROM), erasable programmable ROM (EPROM), resistance variable memory, such as phase change random access memory (PCRAM), resistive random access memory (RRAM), or magnetoresistive random access memory (MRAM), among others.

Flash memory is utilized as non-volatile memory for a wide range of electronic applications. Flash memory devices typically include one or more groups of one-transistor, floating gate memory cells, or charge trap memory cells that allow for high memory densities, high reliability, and low power consumption. Two common types of flash memory array architectures include NAND and NOR architectures, named after the logic form in which the basic memory cell configuration of each is arranged. The floating gate or charge trap memory cells of the memory array are typically arranged in a matrix. The gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a column of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of the row of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and quad-level cell (QLC) can refer to a memory cell that can store four bits of data per cell. In other examples, MLC can refer to any memory cell that can store more than one bit of data per cell.

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Memory arrays or devices can be combined together to form a storage volume of a memory system, such as a solid state drive (SSD), a Universal Flash Storage (UFS) device, multimedia card (MMC) solid-state storage devices, and embedded MMC (eMMC) devices. These devices can be used as, among other things, the main storage device of a computer, having advantages over traditional hard drives with moving parts with respect to, for example, performance, size, weight, durability, operating temperature range, and power consumption. For example, these devices can have reduced seek time, latency, or other electromechanical delay associated with magnetic disk drives. These devices may also use non-volatile flash memory cells to obviate internal battery supply requirements, thus allowing the drive to be more versatile and compact.

These solid-state devices can include a number of memory devices, including a number of dies or logical units (LUNs). Each die can include a number of memory arrays and peripheral circuitry thereon, and the memory arrays can include a number of blocks of memory cells organized into a number of physical pages. The solid state devices can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2-4 illustrate example device descriptor fields according to some examples of the present disclosure.

FIG. 5 illustrates two alternative Replay Protected Memory Block (RPMB) result structures according to some examples of the present disclosure.

DETAILED DESCRIPTION

Figure 1:
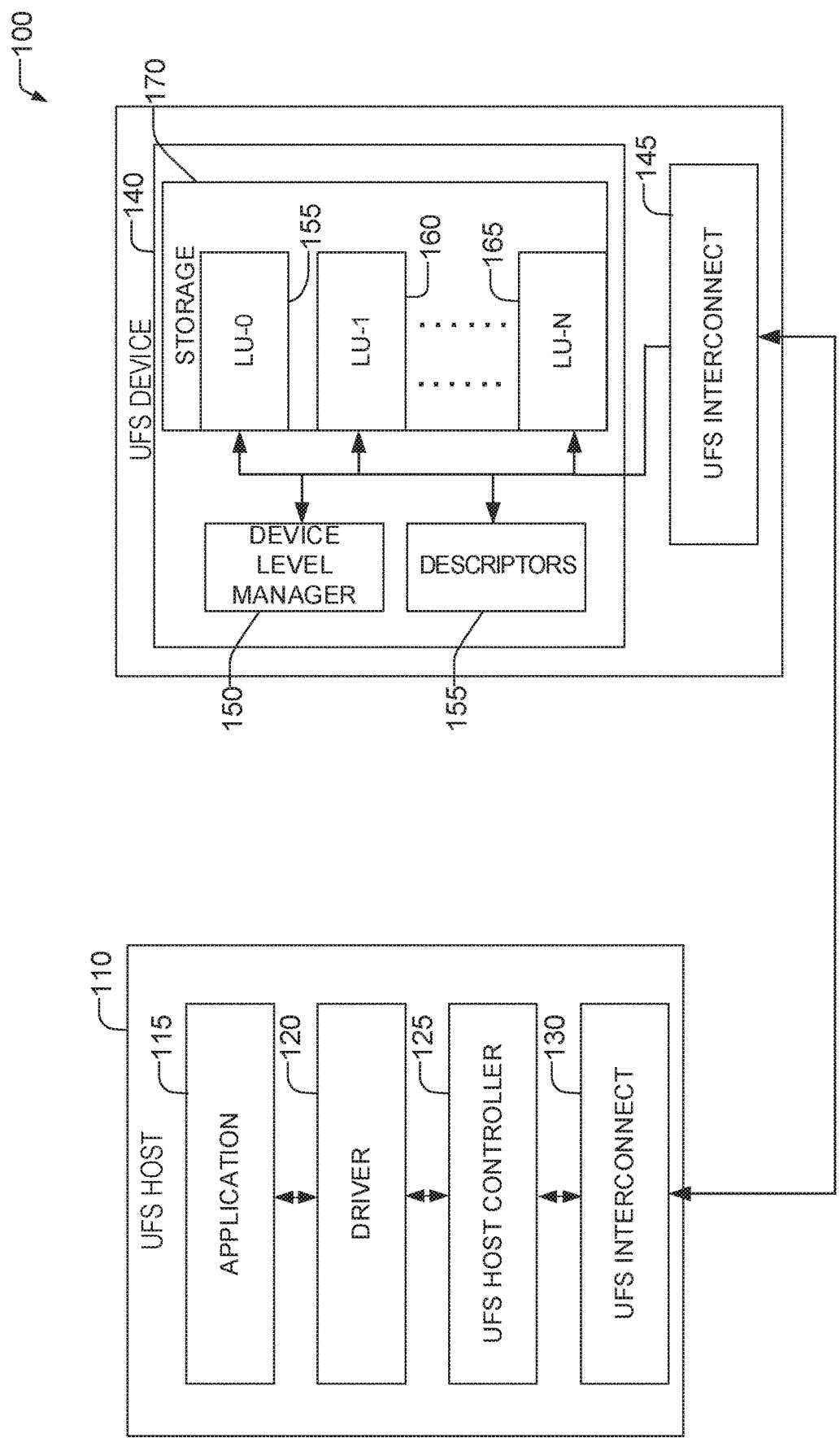
FIG. 1 illustrates a diagram of a UFS system according to some examples of the present disclosure.
Figure 14:
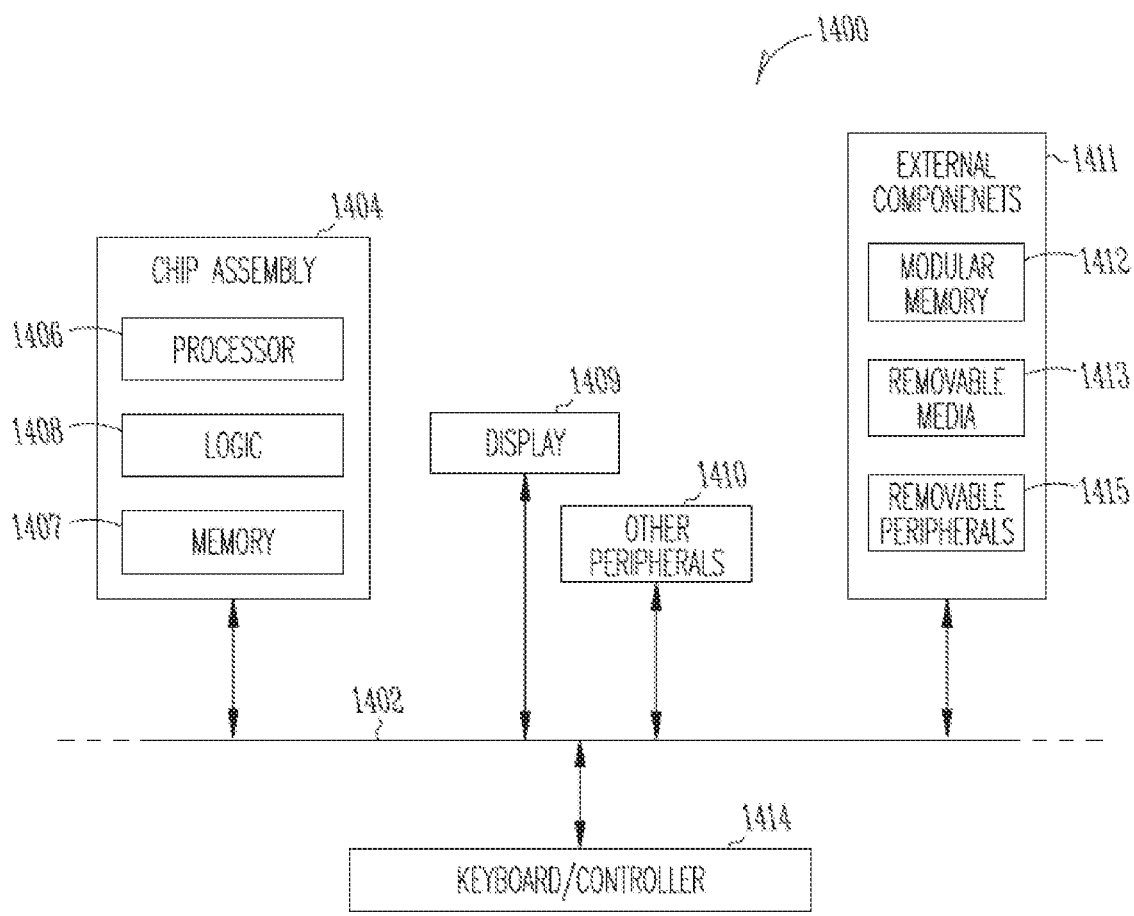
FIG. 14 illustrates an example block diagram of an information handling system according to some examples of the present disclosure.
Figure 17:
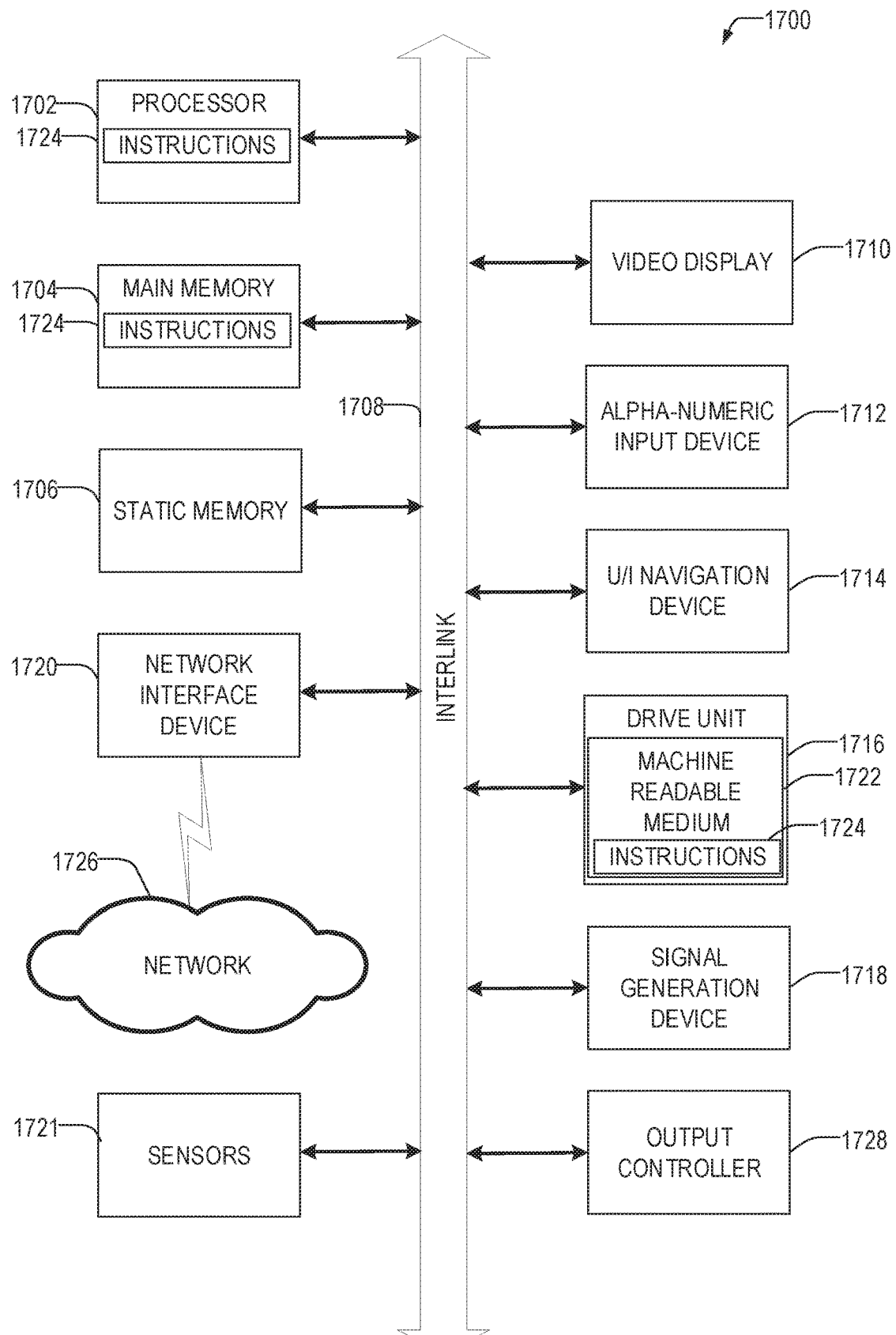
FIG. 17 illustrates a block diagram of an example machine according to some examples of the present disclosure.

Electronic devices (e.g., desktops, laptops, smart phones, tablets, etc.) include several main components: a hardware processor (e.g., a central processing unit (CPU) or other main processor); a graphics processing unit (GPU); volatile memory (e.g., random access memory (RAM), such as dynamic RAM (DRAM), mobile or low-power DDR RAM, etc.); non-volatile memory (e.g., a storage device such as a non-volatile memory (NVM) device, such as flash memory, read-only memory (ROM), a solid state drive (SSD), or other memory device, etc.); a user-interface (e.g., a display, touch-screen, keyboard, one or more buttons, etc.), and the like. Different electronic devices have different hardware depending on their function, including different storage devices depending on their storage needs. Example electronic devices are shown in FIG. 1, FIG. 14, and FIG. 17.

Software (e.g., programs), instructions, the operating system (OS), and other data are stored on the storage device. As the electronic device operates, instructions and data are loaded from the storage device and into volatile memory (e.g., the DRAM) for use by the processor. Random Access Memory (e.g., DRAM) is typically faster, but volatile, and thus a storage device is utilized to store programs suitably for long term storage, including while the electronic device is in an "off" condition.

Storage devices optimized for mobile electronic devices, or mobile storage, traditionally include either discrete memory devices and/or removable storage devices (for example, multimedia card (MMC) solid-state storage devices (e.g., micro secure digital (SD) cards, etc.). MMC devices include one or more parallel interfaces (e.g., an 8-bit parallel interface) with a host device, and are often removable and separate components from the host device.

As demand for mobile device performance continues to increase, such as to fully enable virtual or augmented-reality devices, utilize increasing networks speeds, etc., storage devices have shifted from parallel to serial communication interfaces. Universal flash storage (UFS) devices (including controllers and firmware) are flash devices that communicate with a host device using a low-voltage differential signaling (LVDS) serial interface with dedicated read/write paths, further advancing greater read/write speeds. UFS devices communicate according to the UFS standard promulgated by the Joint Electron Device Engineering Council (JEDEC) solid state technology association.

Turning now to FIG. 1 a diagram of a UFS system 100 is illustrated according to some examples of the present disclosure. A UFS host 110 is an entity or a device with the characteristics of a computing device (e.g., as shown in FIGS. 14 and 17) that includes one or more Small Computer System Interface (SCSI) initiator devices. In some examples, the host may be an application processor of the electronic device (e.g., processor 1702 of FIG. 17). Initiator devices (initiators) are devices or processes which initiate a UFS transaction to a target device and are identified by an Initiator ID (IID). For example, different processes (e.g., operating systems) may each have a unique IID, a radio portion of a phone might have a unique IID and the like.

The UFS host 110 may execute one or more applications 115 that read or write data to the UFS device 140. Applications 115 interface with a UFS driver 120 which manages the UFS host controller 125 through a UFS Host Controller Interface using a set of registers. Registers may be volatile memory, non-volatile memory, or any combination and may be a temporary storage location that is used by the UFS host controller 125. The UFS host controller 125 utilizes the UFS interconnect 130 to communicate with the UFS interconnect 145 of the UFS device 140. The UFS devices is a target device (e.g., receives UFS commands). An electronic device may include both the host and the UFS device. The UFS interconnect comprises the physical layer and provides basic transfer capabilities to the upper layers. The UFS interconnect 145 communicates with the components of the UFS device 140. In some examples, the UFS host 110 and UFS device 140 may be parts of an electronic device, such as shown in FIGS. 14 and 17. In other examples, the UFS host 110 may be an application specific integrated circuit (ASIC), or one or more other microprocessors designed to act as an interface the UFS device 140. In some examples, applications 115, driver 120, UFS host controller 125 and UFS interconnect 130 may be implemented in hardware or software (e.g., be implemented as computer readable instructions that are performed by a hardware processor such as processor 1702 of FIG. 17).

Figure 10:
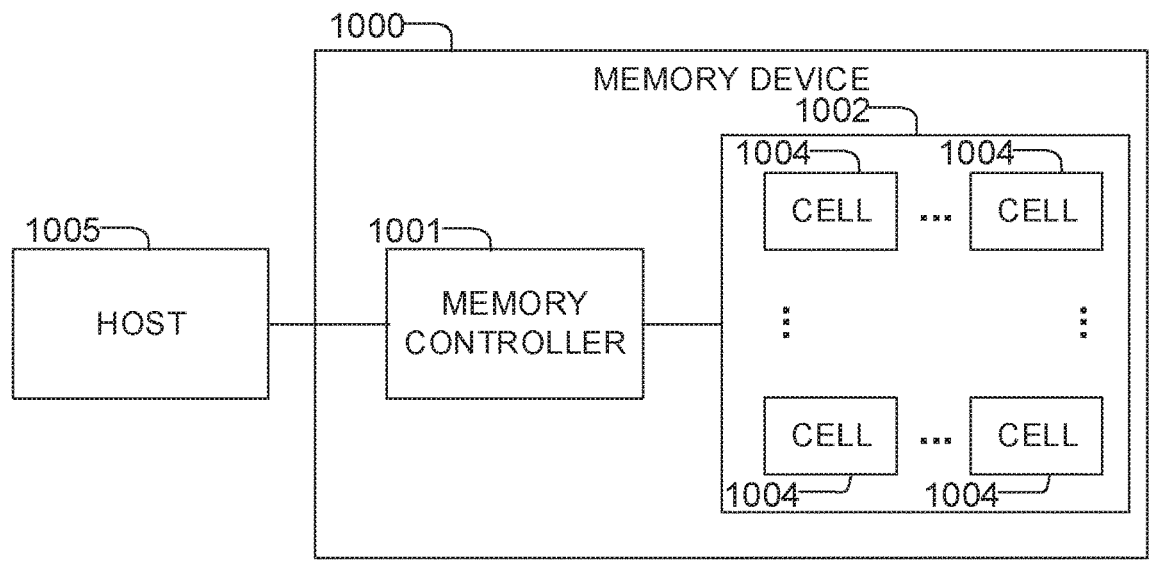
FIG. 10 illustrates an example block diagram of a memory device according to some examples of the present disclosure.

UFS device 140 features a device level manager 150 that provides for device level features such as power management, and the like (which may be executed by memory controller 1001 of FIG. 10). Descriptors 155 store configuration related information. Storage 170 may be one or more NAND storage cells or storage devices segmented into a plurality of Logical Unit (LU)s 0-N (155, 160, 165) which handle read/write and other storage related commands. For example, a 16 GB UFS device might be configured as 4 LUs of 4 GB each. In some examples, each die on a memory device may be a LUN. Storage 170 may be an example organization of memory cells 1004 of FIG. 10. In some examples, the device level manager 150, descriptors 155, and UFS interconnect 145 may be implemented by one or more hardware processors.

While the disclosure herein may be described with respect to UFS, one of ordinary skill in the art with the benefit of the present disclosure will recognize that the disclosed improvements may also be applied to eMMC and other interfaces between a storage device and a host.

Voltage Level Support

As UFS evolves, additional features are added. For example, UFS 2.1 is migrating to UFS 3.0. During the migration to UFS 3.0, device manufacturers are expected to transition their memory devices from using 3.3 volt to 2.5 volt nominal NAND core supply. UFS 3.0 is eventually expected to utilize 2.5V VCC and 1.2V VCCQ voltage supplies. It is also expected that a 1.8V VCCQ2 supply will eventually be eliminated. As a result of these changes in power, it may be desirable to have host systems that are compatible with both UFS 2.1 and UFS 3.0 devices until UFS 3.0 is fully established. Further, voltage level support provides the additional benefit that a device in a system can be powered on at a first voltage level, registers can be read, and then the voltage level of the device can be reduced to a second voltage level to save power, if the appropriate devices in the system support the second, lower voltage level. If a device in the system does not support the second, lower voltage level, the first voltage level can be maintained.

Disclosed in some examples are systems, methods, memory devices, and machine-readable mediums that provide for a device voltage compatibility indication provided by the storage device that can be accessed by, or is provided to the host. The host may then set the proper supply voltages. The supply voltages may be provided to the host upon request. For example, a new UFS message (e.g., UFS Protocol Information Unit message) may be defined that allows the host to request the supported voltage levels, that may then be provided in a response message. In other examples, the existing UFS device descriptor framework may be utilized and a new device descriptor may provide the supply levels that are supported by the device. As will be explained below, the host may query the device descriptors for information about the device.

Turning now to FIGS. 2-4, those figures illustrate example device descriptor fields according to some examples of the present disclosure. FIG. 2 illustrates a diagram of a VCC supply capability field according to some examples of the present disclosure. The table shows a bit layout for a VCC supply capability field in a device descriptor. For example, a "1" in the Bit[1] 3.3V field indicates the device supports 3.3V VCC supply. A "1" in the Bit[0] 2.5V field indicates that the device supports 2.5V VCC Supply. A "1" in both fields indicates that the device supports both 3.3V and 2.5V.

FIG. 3 shows diagrams of VCCQ and VCCQ2 supply capability fields according to some examples of the present disclosure. The tables show bit layouts for VCCQ and VCCQ2 supply capability. The VCCQ table indicates what VCCQ supplies and supply levels are supported by the device. For example, a "1" in the Bit[0] 1.2V field indicates the device supports 1.2V VCCQ supply. A value of 0 indicates no device support for VCCQ. The VCCQ2 table shows what VCCQ2 supplies and supply levels are supported by the device. For example, a "1" in the Bit[0] 1.8V field indicates the device supports 1.8V VCCQ2 supply. A value of 0 indicates no device support for VCCQ2.

Putting these values together, FIG. 4 shows a diagram of a proposed device descriptor field (e.g., stored in device descriptors 155 of FIG. 1) utilizing the capability fields of FIGS. 2 and 3 according to some examples of the present disclosure. For example, at offset 31$h$, a 3-byte field called "SUPPLY_USAGE" may indicate the voltages supported by the device. As noted in the FIG, byte 0 is occupied by the fields from FIG. 2—that is, a value of 0 is reserved, 1 is 2.5V, 2 is 3.3V and 3 is both 2.5V and 3.3V. Byte 1 indicates VCCQ support—0 if not supported, 1 if 1.2V is supported. Byte 3 indicates VCCQ2 support—0 if not supported, 1 if 1.8V supported. While FIGS. 1-4 showed specific locations and values for these fields, one of ordinary skill in the art with the benefit of the present disclosure will appreciate that other locations and other values and organizations of these fields may be utilized. The column labeled "SIZE" indicates the size of the field SUPPLY_USAGE as a three-byte field. The column labeled "MDV" stands for manufacturer default value and that indicates that the default value varies by device. User Conf. specifies which fields can be configured by the user writing the configuration descriptor. The "NO" in FIG. 4 indicates that the user cannot overwrite the value.

Figure 18:
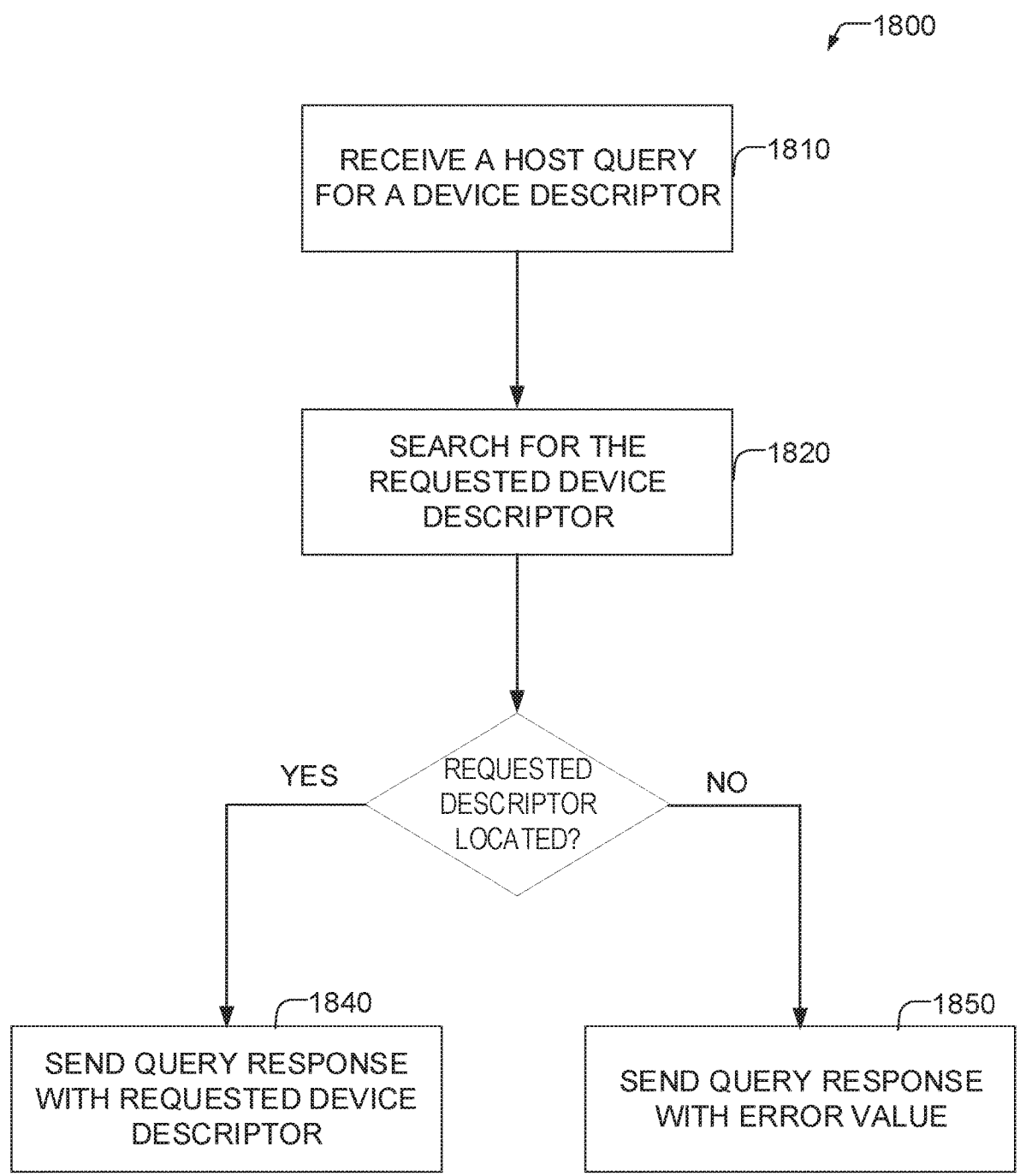
FIG. 18 shows a flowchart of a method for a memory device providing a device descriptor in response to a request.

Device descriptors are one or more blocks or pages of parameters that describe something about a device. UFS Device descriptors of a storage device are queried by the host through a Query Request UFS Protocol Information Unit (UPIU) and the device descriptor is provided through a Query Response UPIU. For example, the proposed device descriptor field in FIG. 4 may be, or be included with, a device descriptor that can be queried by the host. FIG. 18 shows a flowchart of a method 1800 for a memory device providing a device descriptor in response to a request. The method 1800 applies generally to all device descriptor requests, but will also be described in reference to the voltage supply case. At operation 1810 the memory device receives a host query for a device descriptor—e.g., through a UPIU request message. In some examples, the message may be for a device descriptor including the device SUPPLY_USAGE capability. At operation 1820 the device searches for the requested device descriptor. If the requested device descriptor is found, then a query response with the requested device descriptor (e.g., the SUPPLY_USAGE capability) is sent at operation 1840 (e.g., as part of a Query Response UPIU). If the requested device descriptor is not located then at operation 1850, a response is sent with an error code (e.g., as part of the Query Response UPIU).

Figure 19:
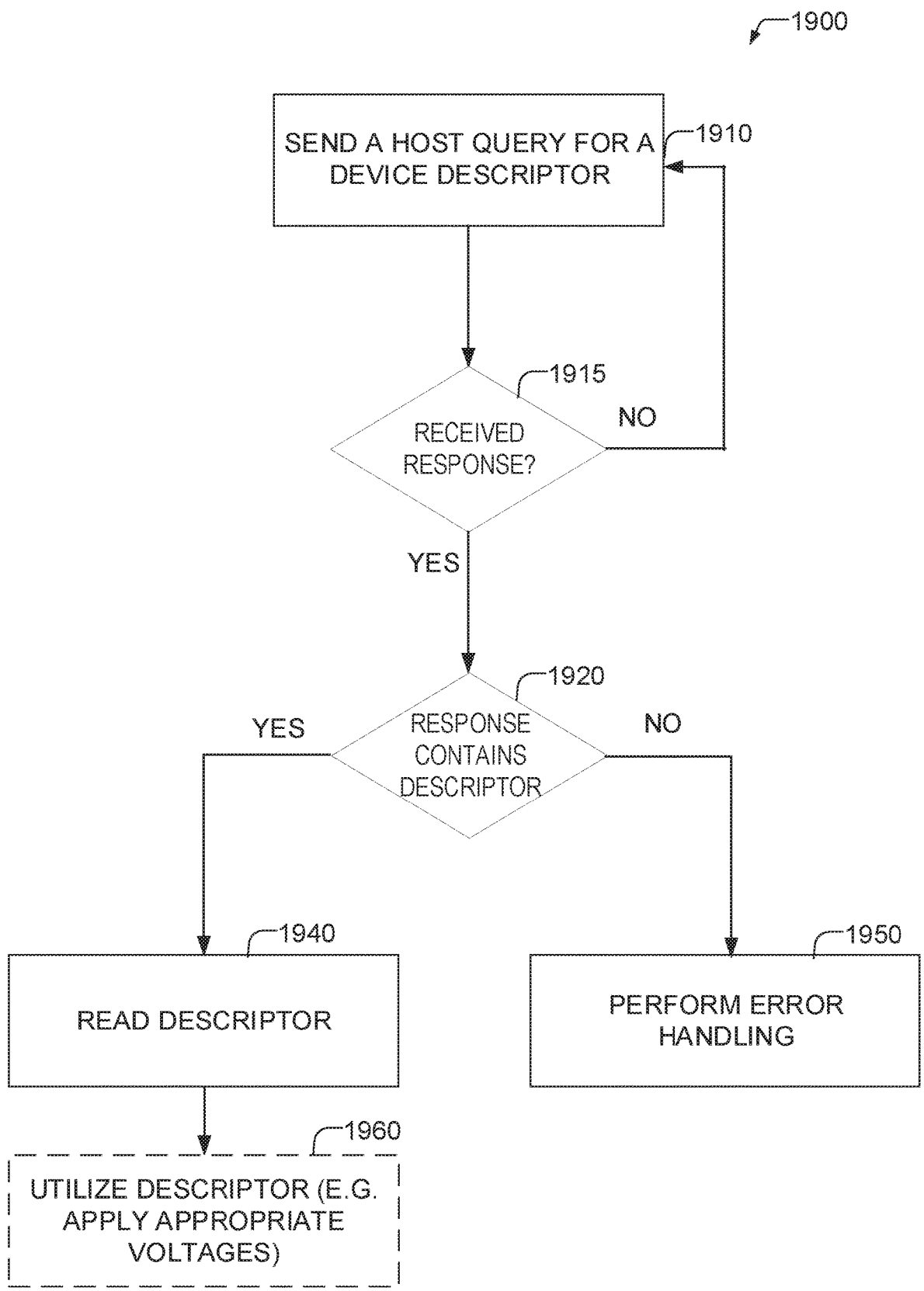
FIG. 19, a flowchart of a method of a host device reading a device descriptor of a memory device is shown according to some examples of the present disclosure.

Turning now to FIG. 19, a flowchart of a method 1900 of a host device reading a device descriptor of a memory device is shown according to some examples of the present disclosure. The method 1900 applies generally to all device descriptor requests, but will also be described in reference to the SUPPLY_USAGE capability case. At operation 1910 the host may send a host query for values of a device descriptor. For example, a device descriptor with the SUPPLY_USAGE capability. The host may set a timer to ensure that a response is received. At operation 1915, if the response is not received within a timeout period, the host may retry the message at operation 1910. If a response is received, then at operation 1920 the response may be parsed and a determination may be made if the response includes the requested descriptor. If not, then at operation 1950 various error handling procedures may be adopted. If the response contains the descriptor, then at 1940 the descriptor may be read and/or saved to a memory of the host device (e.g., in a RAM of the host device). At operation 1960, the host may utilize the descriptor. For example, the host may apply the appropriate voltages indicated in the SUPPLY_USAGE capability to the UFS device.

Performance Throttling Notification

Storage devices (such as UFS devices) may have one or more indicators that trigger performance throttling to prevent damage to the storage device, prevent errors when reading values from the storage device, and the like. For example, high temperatures (either ambient temperatures or device temperatures) can impact the reliability of the storage device, and may cause increased power consumption due to increased transistor leakage at high temperatures. The storage device may have the ability to throttle performance to reduce self-heating to help control device temperature and to avoid excessive power consumption. For example, circuitry and/or firmware within the controller of the memory device may respond to a temperature sensor output indicating the crossing of a temperature threshold (either internal or external ambient sensors), by setting a temperature too high exception event register, and throttling performance. In other examples, the circuitry and/or firmware may set a performance throttling exception event register and throttle performance. Throttling could mean accessing fewer NAND memory cells in parallel, accessing the NAND memory cells (such as pages) with a reduced NAND interface speed, stopping or slowing down the acceptance of input and output commands, and the like. In some examples, it may be advantageous for the host to be aware that this performance throttling has occurred.

In some examples, throttling may be the natural byproduct of device wear or from the device filling up with data. For example, when an SLC cache begins to degrade. An SLC cache is a group of memory cells configured as a cache to temporarily store incoming writes prior to moving those writes to MLC (multi-level cell), TLC (triple level cell), or QLC (quad level cell) storage elsewhere on the drive. As SLC cells allow for faster writing, utilizing SLC cells as a cache can increase write performance at the expense of additional storage capacity. Because all writes to the device are to the SLC cells in the cache, these cells are heavily used and may begin to wear faster than the other cells. At a certain point, the SLC cells in the cache will begin to fail. When enough cells fail, the cache performance may begin to degrade as data cannot be migrated from the SLC cache to the MLC, TLC, and QLC storage fast enough to handle the incoming writes.

In addition to high temperatures and degradations of SLC cache, the UFS device may throttle performance when the device, or a pool of the device is low on space. A pool may be a group of memory cells (e.g., NAND blocks) that are reserved for a specific function. In some examples, each pool may have its own over provisioning and spare blocks. When the device is low on space, performance may suffer as there is less space for maintenance such as garbage collection. In some examples, this performance throttling may be for the device overall, or for one or more pools. In some examples, the device may be partitioned into one or more memory pools. When the memory cells that make up these pools begin to wear, the pool size shrinks. As the pool may be independently managed (e.g., treated as a separate device), as the free space decreases, drive operations take longer as there is less free space to do operations such as garbage collection on the pool (e.g., memory from a first pool is not used to do garbage collection on a second pool). Space may be lost as a result of the user storing too much data, or from the storage device degrading over time (and losing overprovisioning), or both.

Disclosed in some examples are methods, systems, memory devices, and machine-readable mediums that provide a notification of storage device performance throttling to a host. Also disclosed are methods a host may take in fixing the performance throttling condition. In some examples, to provide a notification of performance throttling, wording may be added to existing notifications. For example, a current notification may be overloaded with a throttling notification, such as a temperature notification event. For example, wording may be added specifying that while the TOO HIGH TEMPERATURE flag is true, the device may operate at reduced performance. In some examples, the wording may be displayed by the host to a user, or may be used by the host to counter the high temperatures (e.g., by activating cooling in the host, warning the user, and the like). In some examples, one or more attributes, flags and descriptors may be used for alerting the host to a performance throttling condition.

For example, an exception event may be added that may specifically call out this performance throttling. For example, an exception event: "Performance Throttling" that explicitly shows when the device has reduced performance to help prevent over-heating or other triggering circumstances. The exception event mechanism may have three components: a status attribute, a control attribute, and an alert flag. The control attribute may be set by the host to the exception events the host is interested in receiving an alert for. The alert flag may be set when one of the exception events the host is interested in is active. The status attribute may indicate which exception events are currently active at the NAND memory device. For example, a bit may be set in the status attribute indicating that performance throttling is ongoing. Other bits may correspond to other exception events. If at least one of the status attributes are set and the corresponding control attribute is set, the alert flag may be set to indicate that the exception event is present. The alert flag may be passed to the host in a response UPIU message or in other ways such as a notification. The host may then query the status attribute to determine which exceptions are active.

As an example, an attribute may be defined: wExceptionEventStatus that includes a bit assigned to each exception event, including the Performance Throttling event. The storage device may set an indication in wExceptionEventStatus (e.g., a bit) to one when the corresponding exception events are active (such as when there is performance throttling), otherwise they are set to zero. There may also be an attribute wExceptionControl that specifies the events that are reported in an EVENT_ALERT. The EVENT_ALERT may be communicated in a sub field of a Device Information field of a response UFS Protocol Information Unit (UPIU) that is generated to indicate the successful or failed execution of a command. A bit in the wExceptionEventControl attribute is assigned to each exception event. The EVENT_ALERT bit is set if there is at least one wExceptionEventStatus bit set that has a corresponding wExceptionEventcontrol bit set. The wExceptionEventControl attribute allows the host to customize the events it is interested in knowing about. For example, the wExceptionEventControl attribute may be set or reset by the host. If the EVENT_ALERT bit is set, a host may read the wExceptionEventStatus attribute to discover the source of the event and if it is a performance throttling event.

While the PERFORMANCE_THROTTLING exception event bit is set, the host should expect reduced performance from the device. The host may send a Query Request to the NAND device with the Read Attribute opcode to read an attribute that may provide a reason that performance is being throttled. One example attribute for providing the reason that performance throttling is enabled may be a bThrottling-Status attribute. The bThrottlingStatus attribute will remain set while the condition exists and may indicate a reason for why the performance is being throttled. The bThrottlingStatus attribute may be cleared once the performance is no longer being throttled. One example reason that performance is throttled is because of high temperatures in the memory device.

As an example, an Attribute table may be defined as:

on space, or the NAND itself running low on space. In addition, the bThrottlingStatus or another field may indicate a severity of the performance throttling. For example, a severity of the temperature overage, a severity of the SLC cache degradation, and the like.

Figure 15:
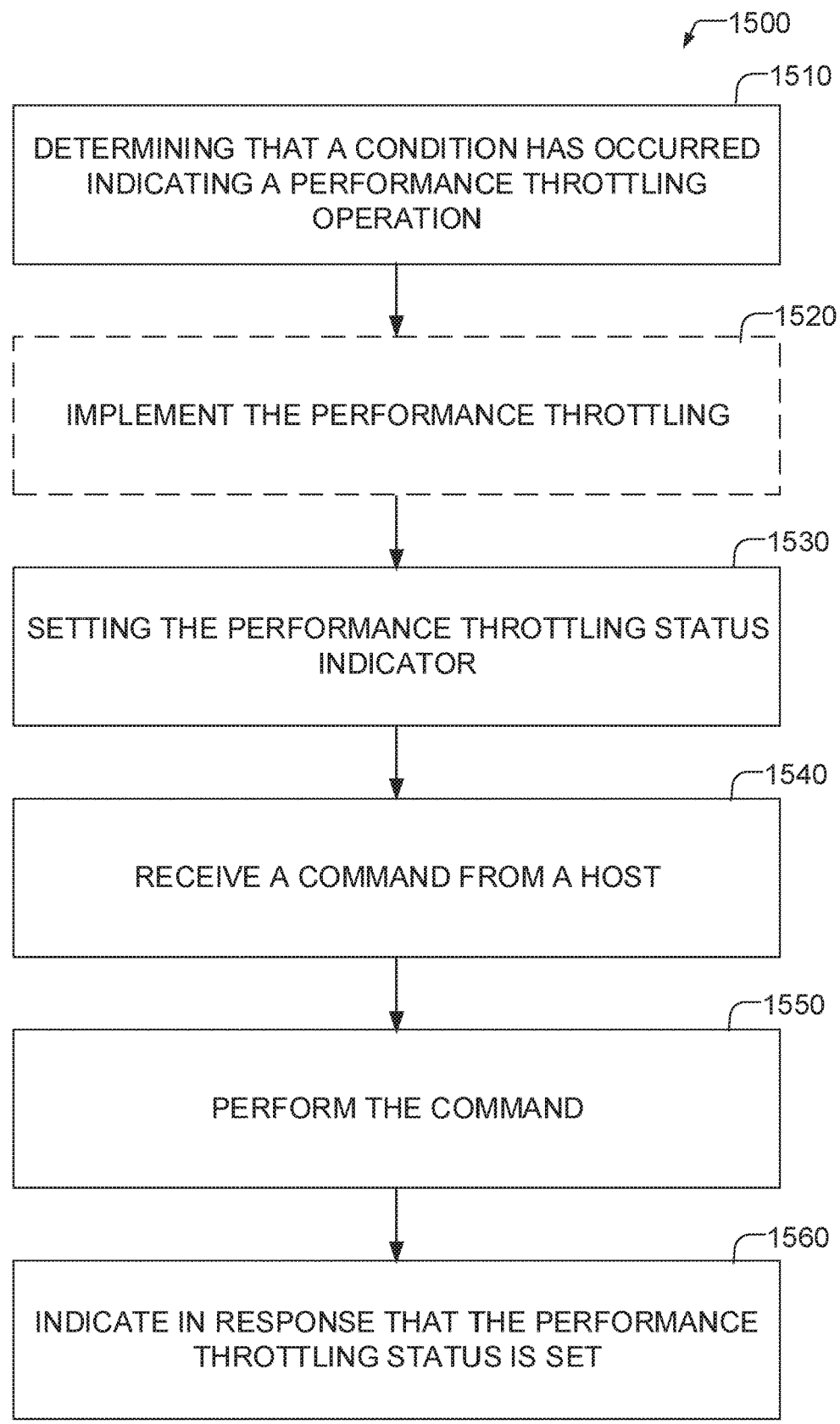
FIG. 15 illustrates a flowchart of a method of performance throttling according to some examples of the present disclosure.

FIG. 15 illustrates a flowchart of a method 1500 of performance throttling according to some examples of the present disclosure. At operation 1510, the memory device may determine that a condition has occurred that indicates a need for a performance throttling operation. For example, a high temperature situation, such as a temperature sensed by a sensor of the memory device transgressing a threshold value, a degradation of an SLC cache (e.g., the number of good SLC cache cells has fallen below a threshold), one or more pools running low on space (e.g., a number of good cells allocated to the pool has fallen below a threshold or a number of good cells that are free that are allocated to the pool has fallen below a threshold), the drive running low on space (e.g., a number of good cells has fallen below a threshold or a number of good cells that are free has fallen below a threshold), or the like. At operation 1520, if the performance throttling is a programmed response to another condition (e.g., high temperatures), the memory device may implement the performance throttling. In other examples, the performance throttling may be a consequence of another condition (e.g., SLC cache degradation) and operation 1520 may not be performed. Example performance throttling may include decreasing a speed at which the memory device runs, decreasing a controller speed, decreasing a speed at

| IDN | Name | Access Property | Size | Type1 #Ind.2 #Sel.3 | MDV4 | Description |
|---|---|---|---|---|---|---|
| 0Dh | wExceptionEventControl | Read/ Volatile | 2 bytes | D | 0000h | Exception Event Control This attribute enables the setting of the EVENT_ALERT bit of Device Information field, which is contained in the RESPONSE UPIU. EVENT_ALERT is set to one if at least one exception event occured (wExceptionEventStatus[i]) and the corresponding bit in this attribute is one (wExceptionEventControl[i]). Bit 0: DYNCAP_EVENT_EN Bit 1: SYSPOOL_EVENT_EN Bit 2: URGENT_BKOPS_EN Bit 3: PERFORMANCE_THROTTLING_EN Bit TBD: Reserved |
| 0Eh | wExceptionEventStatus | Read Only | 2 bytes | D | 0000h | Each bit represents an exception event. A bit will be set only if the relevant event has occurred (regardless of the wExceptionEventControl status). Bit 0: DYNCAP_NEEDED Bit 1: SYSPOOL_EXHAUSTED Bit 2: URGENT_BKOPS Bit 3: PERFORMANCE_THROTTLING Bit TBD: Reserved |
| 1Bh | bThrottlingStatus | Read Only | 1 bytes | D | 0000h | Each set bit represents an existing situation resulting in performance throttling. Bit 0: High Temperature Others: Reserved |

As can be appreciated, the exact bit position of the PERFORMANCE_THROTTLING exception event in both the wExceptionEventControl and wExceptionEventStatus may vary depending upon the implementation and may be different from 3.

In some examples, the bThrottlingStatus may include bits to indicate that the performance throttling is the result of the SLC cache being degraded, one or more pools running low which NAND memory cells are accessed, or the like. At operation 1530, the memory device may set a performance throttling status indicator in an exception event status attribute. For example, setting a bit in a wExceptionEventStatus attribute of the memory device. At operation 1540, the memory device may receive a command message (such as a UPIU). Example commands may include read commands, write commands, query requests, and the like. At operation

1550 the memory device may perform the command. At operation 1560, the memory device may provide a response to the command with a response (e.g., UPIU response). The UPIU response may set a flag (EVENT_STATUS) in the response indicating whether any exception events (e.g., a performance throttling event) are indicated in the attributes (e.g., in a wExceptionEventStatus attribute). In some examples, the UPIU response may set a flag (EVENT_STATUS) in the response indicating whether any exception events are indicated in the attributes (e.g., in a wExceptionEventStatus attribute) only if at least one exception event is indicated that also has a corresponding flag set in a control attribute such as a wExceptionEventControl attribute.

In some examples, a host may take one or more actions as a result of the notification that the NAND is throttling. For example, if the reason for the throttling is a high temperature, the host device may take one or more actions to alleviate the high temperature. Example actions may include turning on a fan, reducing a charging speed (to reduce electrical heat), turning off one or more wireless radios, throttle a processor, slowing down servicing of incoming requests, and the like.

In examples in which the performance throttling is the result of cell degradation in an SLC cache, the host may reduce the size of the general storage by reallocating space from general TLC storage to the SLC cache. In examples in which the performance throttling is the result of low space in a memory pool, space may be freed in the memory pool, or memory cells from a different pool may be reallocated to the pool that is throttled. In examples in which the memory device itself is running low on space, the host may respond by deleting items (e.g., automatically deleting browser cache, unnecessary system files, backup files, and the like) and allocating the space for those items to an overprovisioning area to assist in memory device maintenance activities.

Figure 16:
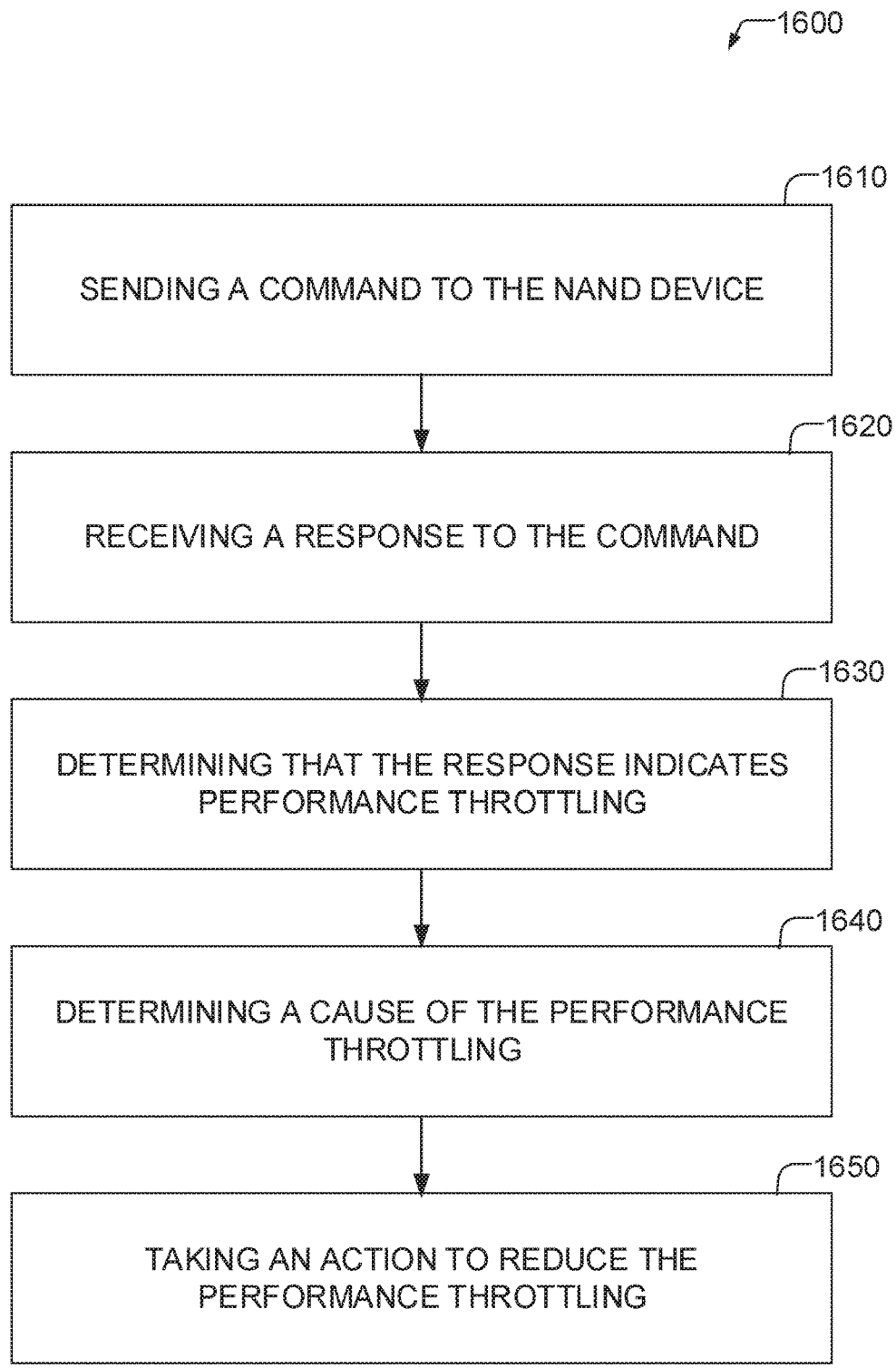
FIG. 16 illustrates a flowchart of a method of a host device discovering and handling performance throttling according to some examples of the present disclosure.

FIG. 16 illustrates a flowchart of a method 1600 performed by a host device to discover and handle performance throttling according to some examples of the present disclosure. At operation 1610 a command may be sent to the memory device across the host interface. For example, a read, write, or query command. The command may be a normal command requested by a process executing on the host device. The response may be received at operation 1620. At operation 1630, the host may determine that the response indicates that an event alert bit is set, and if so, the host may then read the wExceptionEventStatus attribute to determine that the performance throttling event is set. The host may utilize the configuration descriptor reading operations described in FIG. 18 and detailed above. In some examples, the command at operation 1610 (or a previous command) may set a control attribute (e.g., wExceptionControl) that specifies that the performance throttling events are to be reported in an EVENT_ALERT. At operation 1640 the host may determine the cause of the performance throttling. This may be done by reading the bThorttlingStatus attribute (e.g., using the method in FIG. 18). At operation 1650, based upon the reason for the performance throttling the host may take one or more actions.

If the reason for the throttling is a high temperature, the host device may take one or more actions to alleviate the high temperature. Example actions may include turning on a fan, reducing a charging speed (to reduce electrical heat), turning off one or more wireless radios, throttle a processor, slowing down servicing of incoming requests, and the like. In examples in which the performance throttling is the result of cell degradation in an SLC cache, the host may reduce the size of the storage by reallocating space from general TLC storage to the SLC cache. In examples in which the performance throttling is the result of low space in a memory pool, space may be freed in the memory pool, or memory cells from a different pool may be reallocated to the pool that is throttled. In examples in which the memory device itself is running low on space, the host may respond by deleting items and allocating the space for those items to an over-provisioning area to assist in maintenance activities. Actions which reconfigure the memory devices, or pools of the memory device may be executed using one or more configuration messages sent to the memory device.

Replay Protected Memory Blocks (RPMB)

Modern memory devices, such as NAND memory devices, may include protected regions of memory. Regions may include one or more pages, blocks, planes, dies, or the like. These protected regions may be access restricted such that a particular secret value must be provided in order to read, write, and/or erase the value in the protected region. The secret may be for the entire region, or may be particular to a subsection of the region (e.g., the region may be a die and the subsection may be a page). In some examples, the secret value is a key, in other examples, the secret value may be a message authentication code (MAC) that is a hash of the key and another value such as a read or write counter. The use of the MAC value protects the memory region from replay attacks. In some examples, the key is needed for writing and/or reading values. In other examples, the key is needed for writing values and other replay protection is implemented for reading values, such as the requestor sending a nonce value in the read request. The nonce value is then sent in the read response along with an HMAC of the entire response. The nonce value protects against replay attacks on a read request. In these examples, the secret value may comprise the nonce. The following sections describe improvements to an implementation of a protected region—RPMB, but one of ordinary skill in the art with the benefit of the present disclosure will realize that the disclosed improvement may be applicable to other implementations.

RPMB allows for secure storage of sensitive data such as DRM keys that store data to specific memory areas, digital copies of government credentials, items of high value (such as digital concert tickets, boarding passes, etc.), and the like. in an authenticated and replay protected manner. The RPMB cannot be accessed via normal means, but is instead accessed using a set of specific commands. Writes to RPMB are authenticated using a Message Authentication Code (MAC) such as a HMAC SHA-256 algorithm calculated from a security key programmed into the device and a counter value that is incremented by the device each time the RPMB is written. The counter and use of the MAC ensures that messages cannot be captured by an attacker and then later replayed (as the MAC will not match due to the change in the counter). In some examples, each IID may have its own RPMB region, and in other examples some RPMB regions may be shared between IIDs. In some examples, a single IID may be able to access multiple RPMB regions.

A typical RPMB sequence will consist of a RPMB region access from an initiator (IID) on the host followed by a result register read of that same region from the same initiator. Thus, a RPMB sequence generally requires two requests from the host: a first request to initiate the operation and a second request to retrieve the results. Typical UFS devices maintain a single result register per RPMB region that stores the result after the request to initiate the operation is complete. The value stored in the register is provided to any IID requesting the results. Since there is only one result register per region, a second initiation operation to an RPMB region subsequent to a first initiation request will overwrite the result register whether or not the initiator has read the result register from the first request. If a first initiator reads the result register after a second initiator has started another operation on that region, the result will not be valid for the first operation. Currently, there is no indication to the host that the IID of the initiator reading the result register is not the same as the IID of the initiator that started the RPMB sequence. Registers may be volatile memory, non-volatile memory, or any combination and may be a temporary storage location that is used by the storage device.

It is not desirable for the device to prohibit reading of the result register based on the requestor (e.g., based upon the initiator ID (IID)) of the command. For example, it may actually be desirable for the host to allow a second initiator to read the result register in the case of the first initiator does not actually read the result (e.g., becomes unresponsive, or is halted). As a result, if a mismatch of IIDs results in an error, the host may have difficulty understanding the cause of the error, and may have difficulty in resolving the error. To resolve the error without reset, the host could cycle through all IIDs to attempt to read the result register. This is time consuming, and the host has no confidence that it would successfully clear the error since the origin of the error is unclear Disclosed in some examples are methods, systems and machine-readable mediums for error handling in RPMB accesses. In some examples, an initiator identifier (e.g., an IID) information field may be added to the register. For example, the IID information field may be the IID of the initiator of an RPMB sequence. If the initiator that reads the result register detects that its IID differs from the IID in the result, the host may be alerted to an error and perform proper error handling. In other examples, the IID information field may be a single bit that indicates an IID mismatch between the IID that submitted the access request and the IID that is currently requesting the register contents.

FIG. 5 illustrates two alternative Replay Protected Memory Block (RPMB) result structures according to some examples of the present disclosure. In a first prior art version of the result structure 500, bits[15:12] and bits[11:8] are reserved, bit[7] includes a write counter status, bits[6:0] includes an operation status. In a second version 510, bits[15:12] may be utilized to indicate the IID of the requestor. Bits[11:8] may still be reserved, bit[7] still used as a write counter status, and bits[6:0] may be used as operation status. In other examples, the IID could alternatively be stored in the response message type register (e.g., the more free bits). In still other examples, a single bit could be used to indicate an IID mismatch rather than the entire IID of the sequence initiator (use fewer bits in either the result register or the response message type register). The result structure of FIG. 5 is included in a response message, such as an Authenticated Data Read Response message.

Figure 20:
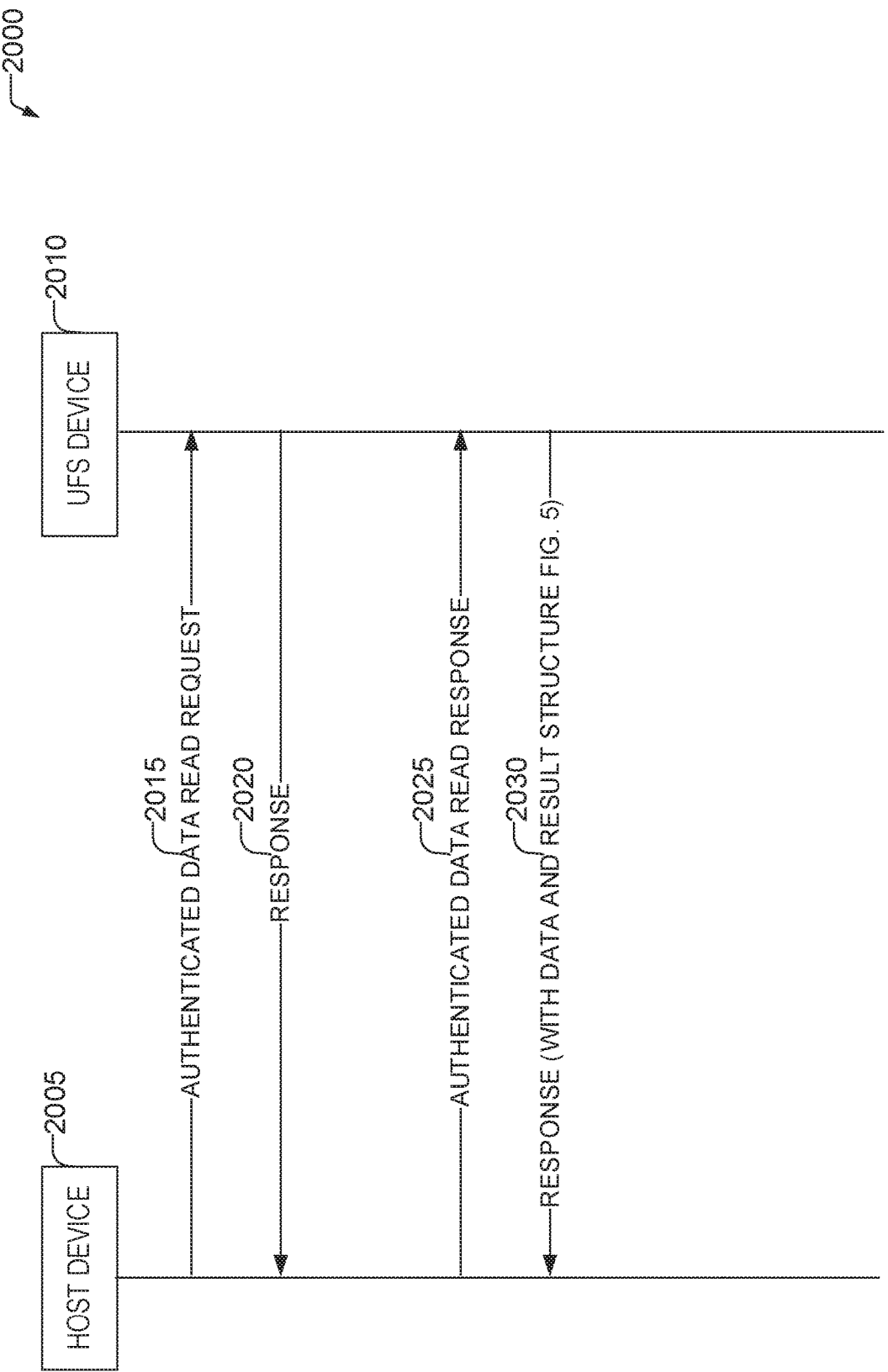
FIG. 20 illustrates a simplified message sequence diagram of a RPMB read request according to some examples of the present disclosure.

FIG. 20 illustrates a simplified message sequence diagram of a RPMB read request according to some examples of the present disclosure. Host device 2005 sends an authenticated data read request 2015 to UFS storage device 2010 (e.g., a NAND memory device, SSD, SCSI device, or the like). In the example of the present invention, the request would include an initiator ID (IID) of the requestor. The UFS device 2010 processes the request, and sends a response 2020. The UFS device 2010 stores the result of the request in one or more registers, including, in some examples the IID of the requestor. At operation 2025 the host device 2005 sends a request for the response message from the UFS device 2010. At operation 2030, the UFS device 2010 provides the response from the register (or other memory location), including the result structure of FIG. 5. An initiator on the host device 2005 may verify that the result it received corresponds to the request it sent based upon the IID in the response. In other examples, rather than a dedicated field, other fields may be reused. For example, RPMB messages may include one or more nonce values (that are utilized in HMAC calculations to verify that a response is responsive to a particular request) that may identify the IID. For example, the nonce may be generated based upon the IID.

Figure 21:
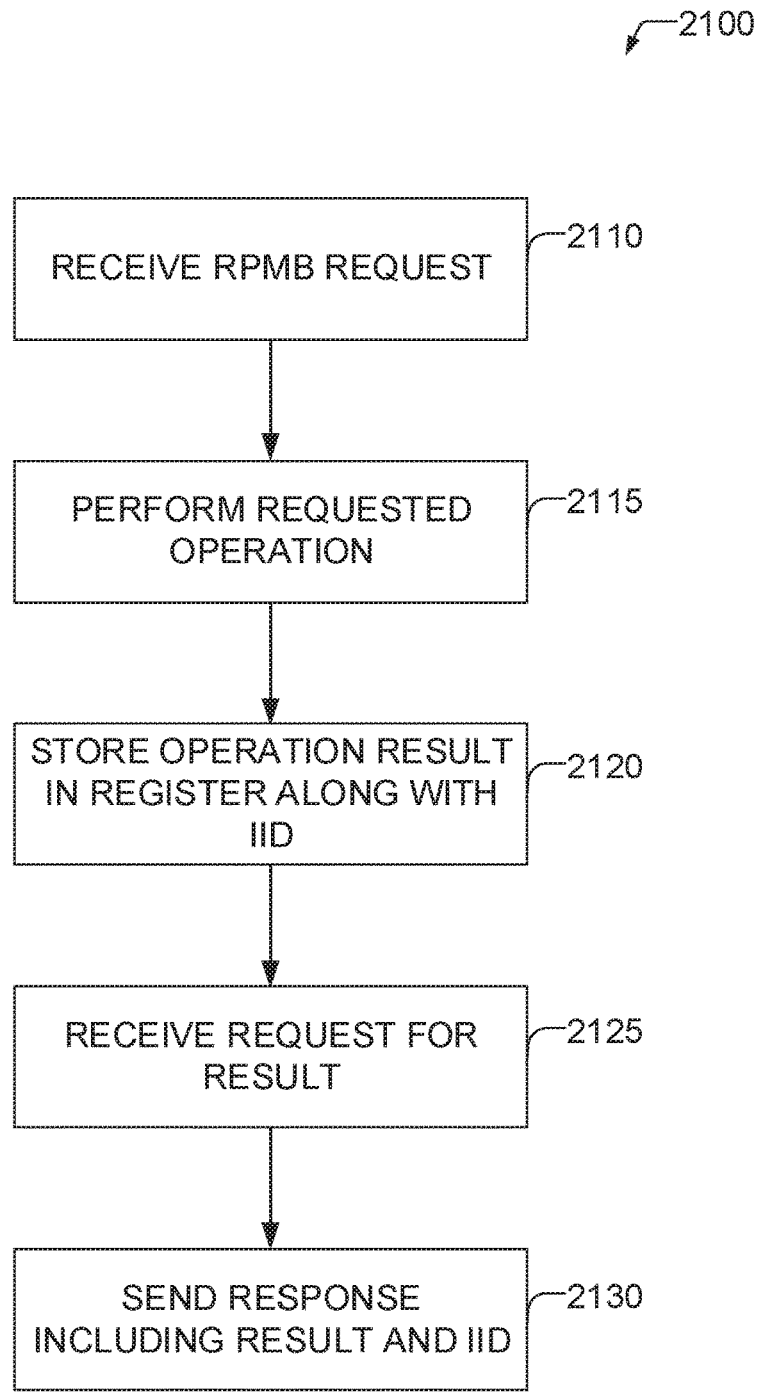
FIG. 21 illustrates a flowchart of a method of a UFS device processing a RPMB request according to some examples of the present disclosure.

FIG. 21 illustrates a flowchart of a method 2100 of a UFS device processing a RPMB request according to some examples of the present disclosure. At operation 2110 the device receives, over the UFS interface, a RPMB request. The request may include the IID of the requestor. The request may be sent according to one or more protocols, such as SCSCI Security Protocol. At operation 2115, the UFS devices performs the requested operation 2115 (or determines that the operation cannot be performed as the request is faulty). At operation 2120, the result is stored in a register (or other memory location) along with the IID of the requestor. In some examples, a response is sent to the host. At operation 2124, a request for the result is received. At operation 2130, the contents of the result register is copied into a response message (including the IID) and sent to the host. As can be appreciated, if a new request comes in after operation 2120 but before operations 2125 and 2130, the result register will be overwritten with the results of the new request. If the same initiator that sent the request at operation 2110 then requests the result register at 2125, the IID field in the result sent at 2130 will not match the initiator ID of the requestor that sent request 2110.

Figure 22:
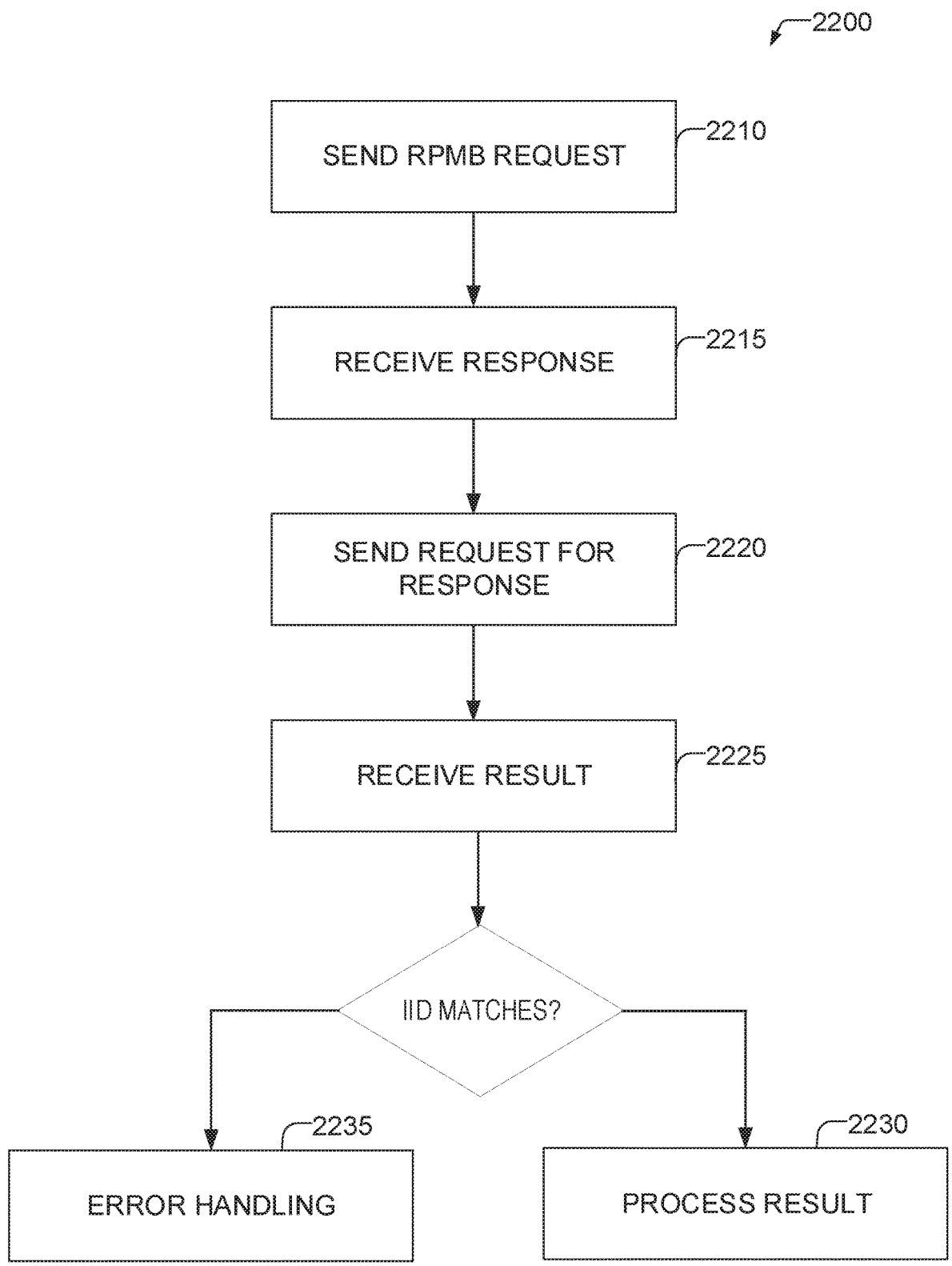
FIG. 22 shows a flowchart of a method of a host device sending an RPMB command according to some examples of the present disclosure.

FIG. 22 shows a flowchart of a method of a host device sending an RPMB command according to some examples of the present disclosure. At operation 2210 the host may send an RPMB command to a UFS device. In some examples, the RPMB command may conform to a SCSCI security protocol. At operation 2215 the host may receive the response. If the response indicates success, then at operation 2220 the host may send a request for the response to the host. At operation 2225, the result may be received. The BD in the result may be compared to the IID of the requestor. If they match then at operation 2230, the initiator may handle the result. If they do not match then at operation 2235 the initiator may initiate error handling procedures. For example, the initiator may attempt to re-read the memory region.

3D NAND

In three-dimensional (3D) architecture semiconductor memory technology, vertical structures are stacked, increasing the number of tiers, physical pages, and accordingly, the density of a memory device (e.g., such as a storage device, described above).

Figure 6:
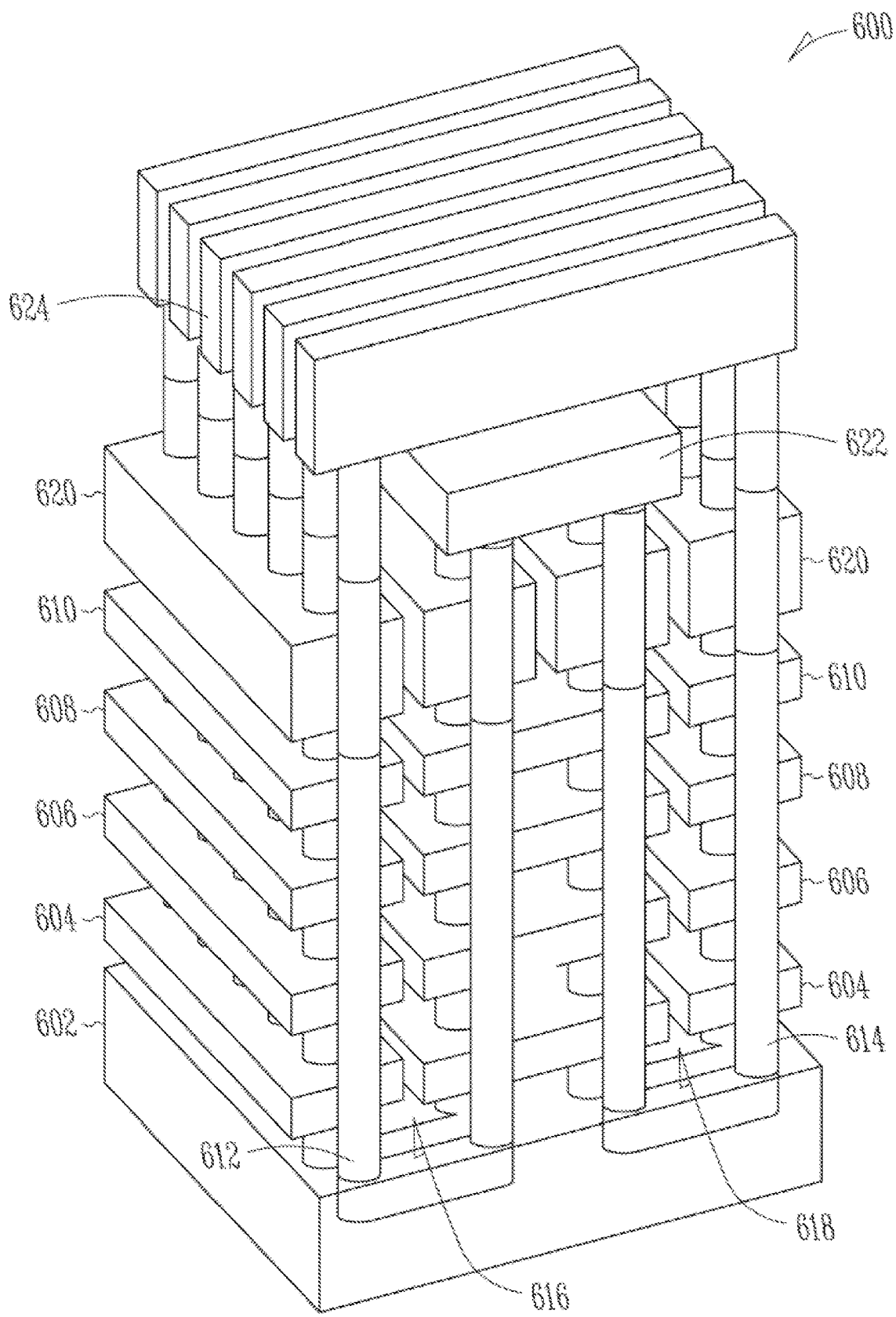
FIGS. 6-7 illustrate example three-dimensional views of a 3D NAND architecture semiconductor memory device according to some examples.

FIG. 6 illustrates an example three-dimensional view of a 3D NAND architecture semiconductor memory device 600 on a substrate 602 according to various embodiments, depicting functional structures defining the architecture, including access lines (e.g., word lines) 604, 606, 608, 610, U-shaped pillars 612, 614, select gates 620, a source line 622, and data lines (e.g., bit lines) 624. Memory device 600 represents a portion of a greater number of similar structures that would typically be found in a block, device, or other unit of NAND memory.

The example memory device 600 includes multiple tiers of memory structures, including first, second, third, and fourth access lines 604, 606, 608, 610 that at least partially surround charge storage structures (in the depicted example, floating gates; but charge trap structures may be used) of respective groups of charge storage transistors (e.g., memory cells), each further including a source, a drain, and a control gate. In the memory device 600 illustrated in FIG. 6, each of the separate first, second, third, and fourth access lines 604, 606, 608, 610 are located at separate tiers of the memory device 600. Although shown with four tiers of access lines in FIG. 6 for purposes of illustration, in various examples in actual devices, the memory device 600 can include a greater number of tiers of access lines, such as 8, 16, 32, 64, etc.

The memory device 600 can include a plurality of semiconductor structures that extend adjacent multiple memory cells, and that function as channels for the charge storage transistors. Although illustrated as having 12 U-shaped pillars in FIG. 6 for purposes of illustration, including first and second U-shaped pillars 612, 614, the memory device 600 can include greater or fewer U-shaped pillars, as desired. Each of the first and second U-shaped pillars 612, 614 can extend into the substrate 602, and can be separated by first or second vertical slots 616, 618, respectively. The first and second U-shaped pillars 612, 614 can include a semiconductor material, such as polysilicon, which in many examples will be formed as a tube (hollow cylinder) of polysilicon defining a central aperture, with a dielectric material filling the aperture.

The memory device 600 can include select transistors formed at each end of the first and second U-shaped pillars 612, 614, and select gates 620 surrounding the select transistors. The source line 622 can be formed on the select transistors at first ends of the first and second U-shaped pillars 612, 614, and the data lines (e.g., bit lines) 624 can be formed on the select transistors at second ends of the first and second U-shaped pillars 612, 614.

In certain examples, one or more of the tiers of semiconductor material can function as a body of a peripheral transistor, such as a decoder transistor, driver, or one or more other peripheral circuits for the memory device 600.

Although illustrated in FIG. 6 using U-shaped pillars 612, 614, the 3D NAND architecture semiconductor memory device 600 can, in other examples, be formed in one or more other shapes of pillars, including substantially vertical (and not U-shaped) pillars having source and data lines at respective first and second ends. Further, in certain examples, the memory device 600 can include multiple vertical structures stacked upon one another, such as illustrated in the commonly assigned U.S. Pat. No. 8,964,474, issued to Midori Morooka et al., and titled "Architecture for 3-D NAND Memory," incorporated by reference herein in its entirety, including its disclosure of stacked arrays of memory cell strings and respective methods of operation.

Figure 7:
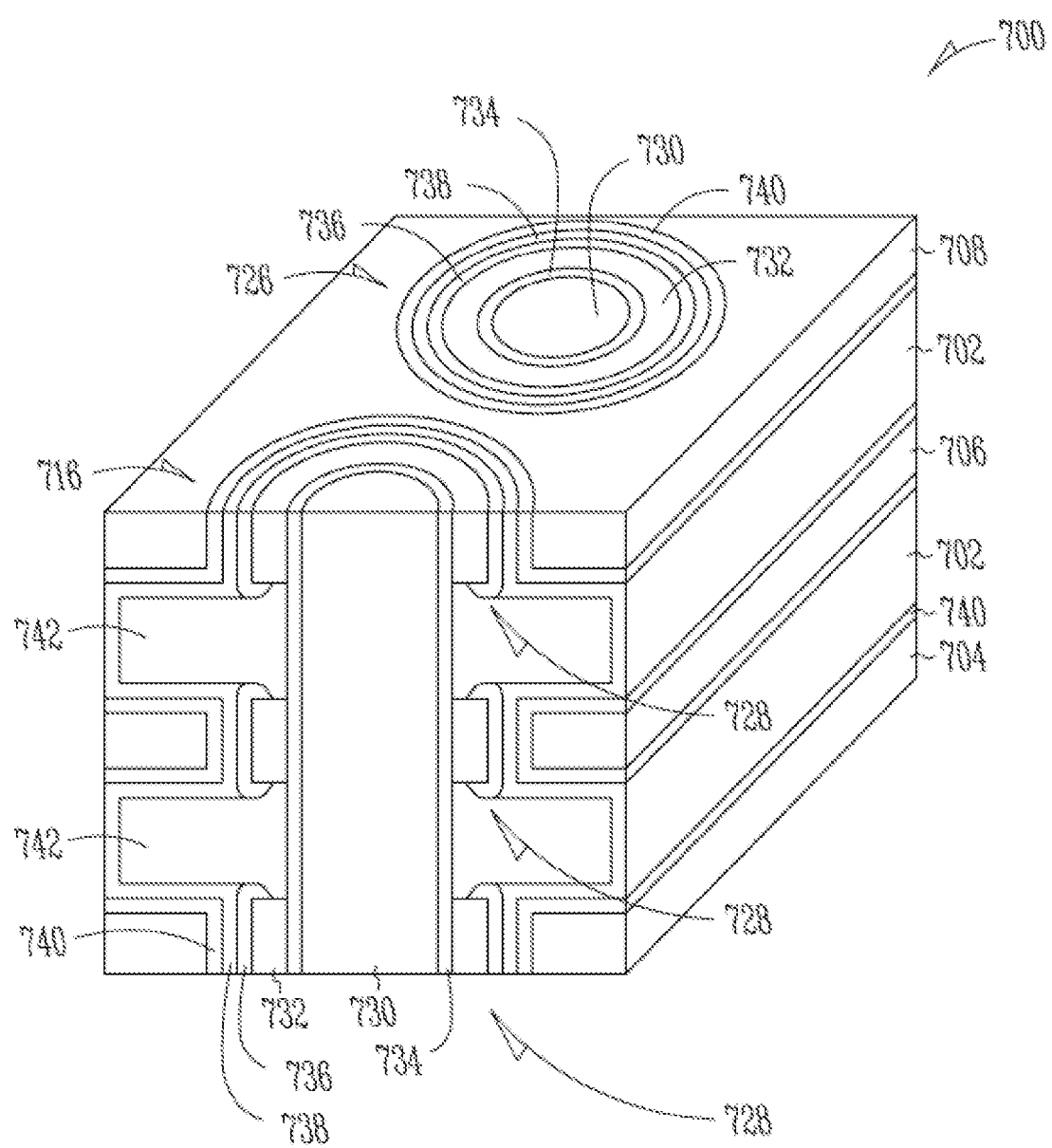

FIG. 7 illustrates an example three-dimensional cross section of a 3D NAND architecture semiconductor memory device 700, including portions of second and third pillars (e.g., U-shaped pillars) 716, 726, first, second, and third access lines 704, 706, 708, and memory cells 728.

Each of the second and third pillars 716, 726 includes a conductive structure 730, preferably a semiconductor material, such as polysilicon. In many examples, the polysilicon will define a central aperture, which will typically be filled with a dielectric material. The portions of the second and third pillars 716, 726 illustrated in FIG. 7 include three individual memory cells 728. Each 3D memory cell 728 includes a volume of semiconductor material, such as, in many examples, a partial ring structure 732 (e.g., p+ type polysilicon, etc.) that functions as a floating gate, separated from the polysilicon of the second and third pillars 716, 726 by a tunnel dielectric 734, and from respective first, second, or third access lines 704, 706, 708 by one or more inter-poly dielectric layers, such as an oxide-nitride-oxide (ONO) structure, including, for example, a first silicon dioxide (SiO2) layer 736, a silicon nitride (Si3N4) layer 738, and a second dioxide layer 740. The respective memory cells 728 are separated from each other by additional tiers of dielectric material 742.

Whereas the memory cells 728 in FIG. 7 include floating gate storage structures, in other examples, other charge storage mechanisms may be utilized, such as charge trapping structures or other forms of storage structures.

Figure 8:
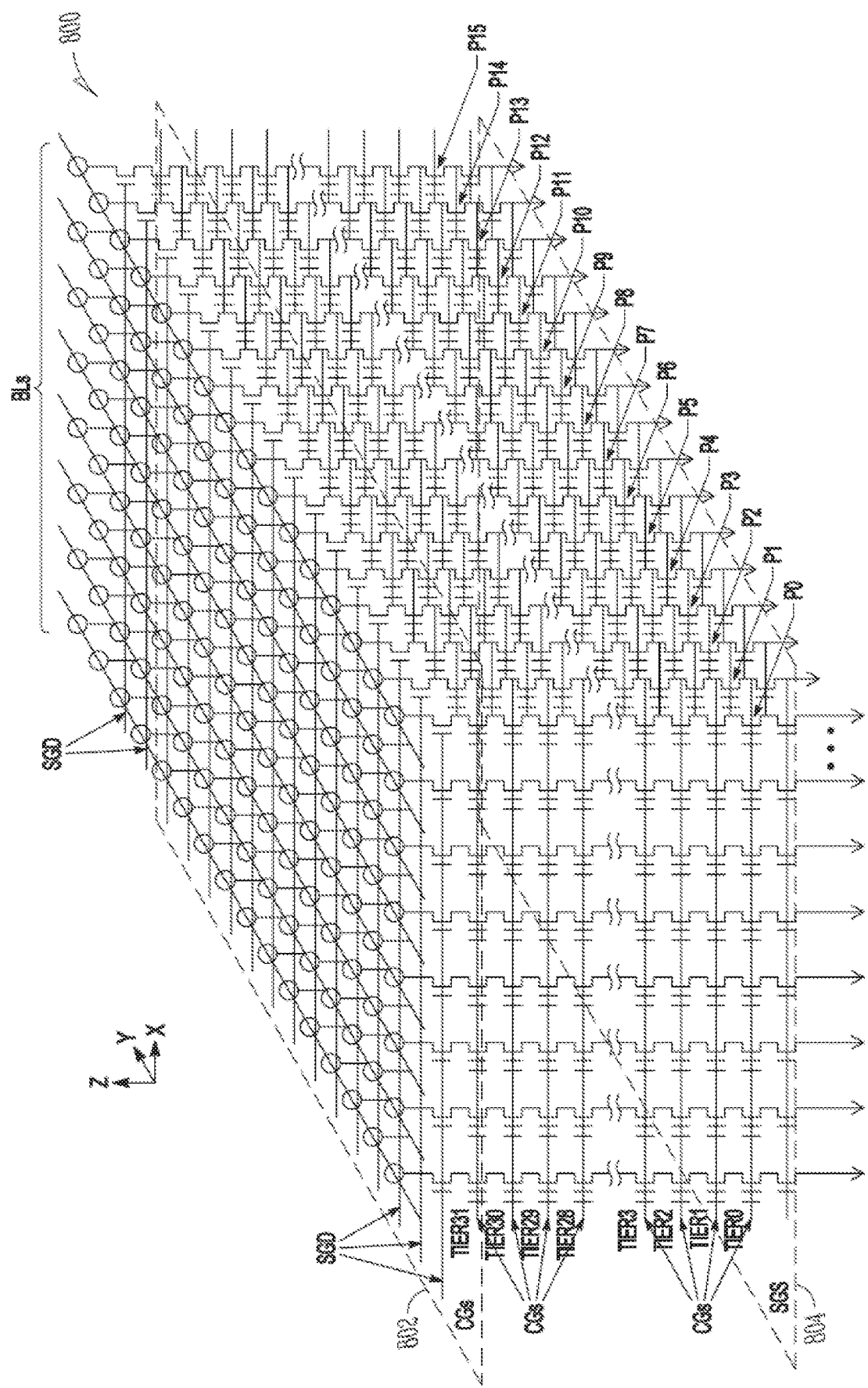
FIGS. 8-9 illustrate example schematic diagrams of a 3D NAND architecture semiconductor memory array according to some examples of the present disclosure.

FIG. 8 illustrates an example schematic diagram of a 3D NAND architecture semiconductor memory array 800 including a plurality of strings of memory cells, each string including 32 tiers (TIER0-TIER31) of charge storage transistors stacked in the Z direction, source to drain, from a source-side select gate (SGS) to a drain-side select gate (SGD). Each string of memory cells in the 3D memory array can be arranged along the Y direction as data lines (e.g., bit lines (BL)), and along the X direction as physical pages (P0-P15). Within a physical page (e.g., P0), each tier represents a row of memory cells, and each string of memory cells represents a column. A block of memory cells can include a number of physical pages (e.g., 128, 384, etc.). In other examples, each string of memory cells can include more or less tiers (e.g., 8, 16, 64, 128, etc.), as well as one or more additional tiers of semiconductor material above or below the charge storage transistors (e.g., select gates, data lines, etc.), as desired.

Each memory cell in the memory array 800 includes a control gate coupled to (e.g., electrically or otherwise operatively connected to) an access line (e.g., word line), which collectively couples the control gates across a specific tier, or a portion of a tier, as desired. Specific tiers in the 3D memory array, and accordingly, specific memory cells in a string, can be accessed or controlled using respective access lines. For example, the memory array 800 includes a first level of semiconductor material 802 (e.g., polysilicon, etc.) that couples the control gates of each memory cell in TIER31, and a second level of semiconductor material 804 that couples the source-side select gates (SGS) of the array. Similar levels of metal or semiconductor material can couple the control gates for each tier. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 9:
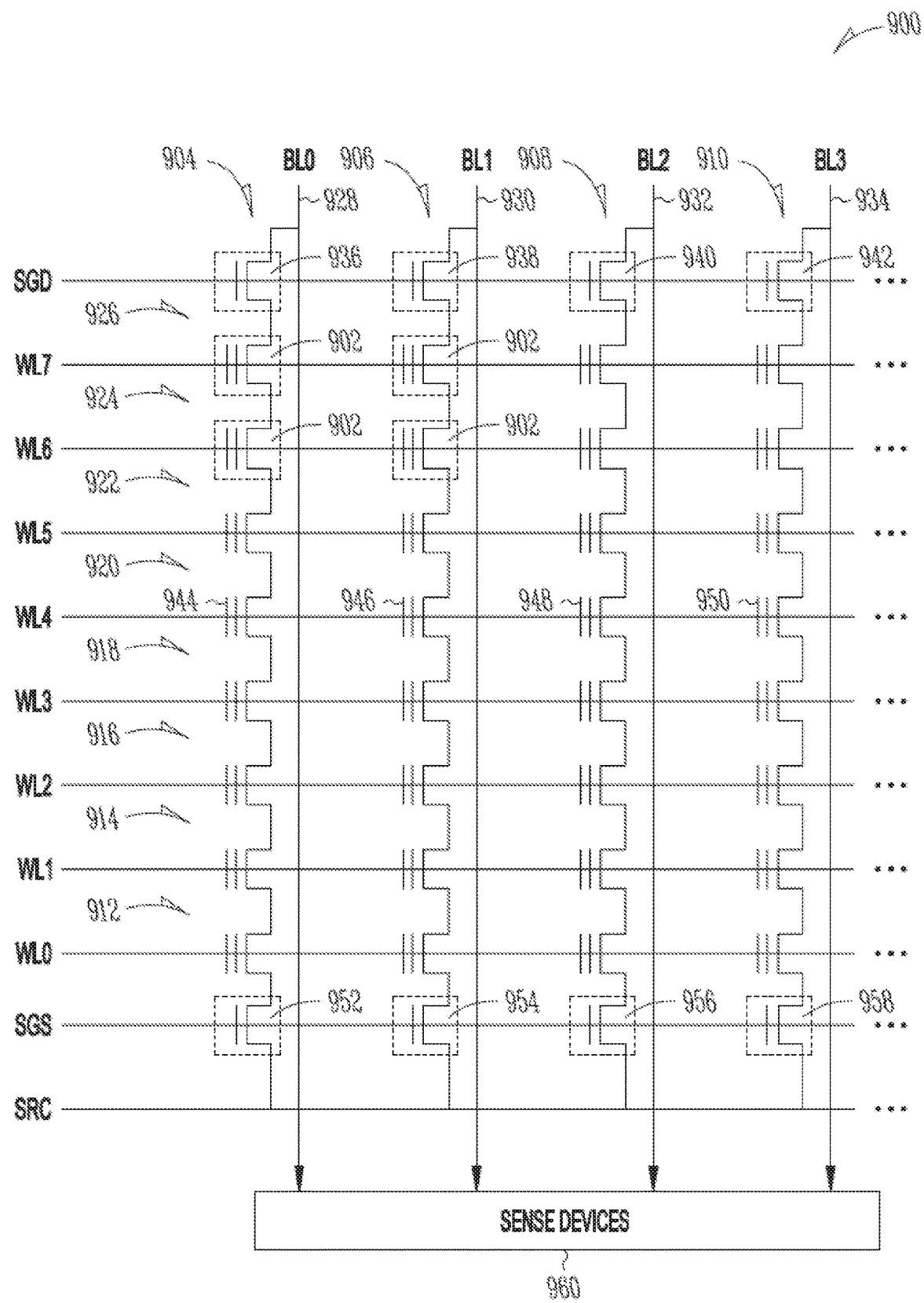

FIG. 9 illustrates an example schematic diagram of a portion of a 3D NAND architecture semiconductor memory array 900 including a plurality of memory cells 902 arranged in a two-dimensional array of strings (e.g., first, second, third, and fourth strings 904-910) and tiers (e.g., TIER0-TIER7 912-926), and sense amplifiers 960. For example, the memory array 900 can illustrate an example schematic diagram of a portion of a physical page of memory cells of a 3D NAND architecture semiconductor memory device. Each string of memory cells is coupled to a source line (SRC) using a respective source-side select gate (SGS) (e.g., first, second, third, or fourth SGS 952-958), and to a respective data line (e.g., first, second, third, or fourth bit lines (BL0-BL3) 928-934) using a respective drain-side select gate (SGD) (e.g., first, second, third, or fourth SGD 936-942). Although illustrated with 8 tiers (TIER0-TIER7 912-926, e.g., using word lines (WL) WL0-WL7) and 4 data lines (BL0-BL3 928-934) in the example of FIG. 9, other examples can include strings of memory cells having more or less tiers (e.g., 16, 32, 64, etc.) or data lines, as desired.

In a NAND architecture semiconductor memory array, such as the example memory array 900, the state of a selected memory cell can be accessed by sensing a current or voltage variation associated with a particular data line containing the selected memory cell. The memory array 900 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL3), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first, second, third, or fourth control gates 944-950 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, such that, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 960, coupled to one or more of the data lines (e.g., first, second, third, or fourth bit lines (BL0-BL3) 928-934), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

FIG. 10 illustrates an example block diagram of a memory device 1000 (e.g., a storage device, such as a UFS device 140 from FIG. 1) including a memory controller 1001 and a memory array 1002 having a plurality of memory cells 1004, and a host 1005 external to the memory device 1000. One or more physical interfaces can be used to transfer data between the memory device 1000 and the host 1005, such as a serial advanced technology attachment (SATA) interface, a peripheral component interconnect express (PCIe) interface, a universal serial bus (USB) interface, M-PHY for UFS, 8-bit parallel, eMMC, or one or more other physical connectors or interfaces. The host 1005 can include a host system, such as a personal computer, a digital camera, a mobile electronic device, a memory card reader, or one or more other electronic devices external to the memory device 1000. In some examples, the memory controller 1001 may implement the functions of the device level manager 150 of FIG. 1 for UFS devices. Descriptors 155 and the UFS interconnect 145 of FIG. 1 are not shown in memory device 1000 for clarity, but may be present either alone or as part of a component that is shown.

The memory controller 1001 can receive instructions from the host 1005, and can communicate with the memory array 1002, such as to transfer data to (e.g., write or erase) or from (e.g., read) one or more of the memory cells 1004 of the memory array 1002. The memory controller 1001 can include, among other things, circuitry or firmware, such as a number of components or integrated circuits. For example, the memory controller 1001 can include one or more memory control units, circuits, or components configured to control access across the memory array 1002 and to provide a translation layer between the host 1005 and the memory device 1000. The memory controller 1001 can include one or more input/output (I/O) circuits, lines, or interfaces to transfer data to or from the memory array 1002.

The memory array 1002 (e.g., a 3D NAND architecture semiconductor memory array) can include a number of memory cells 1004 arranged in, for example, a number of devices, planes, blocks, or physical pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements.

In operation, data is typically written to or read from the memory device 1000 in pages, and erased in blocks. However, one or more memory operations (e.g., read, write, erase, etc.) can be performed on larger or smaller groups of memory cells, as desired. The data transfer size of a memory device is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells 1004 or memory arrays 1002 can provide for different page sizes, or may require different amounts of metadata associated therewith. Cells 1004 or memory arrays 1002 may correspond to the storage 170 of FIG. 1. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 11:
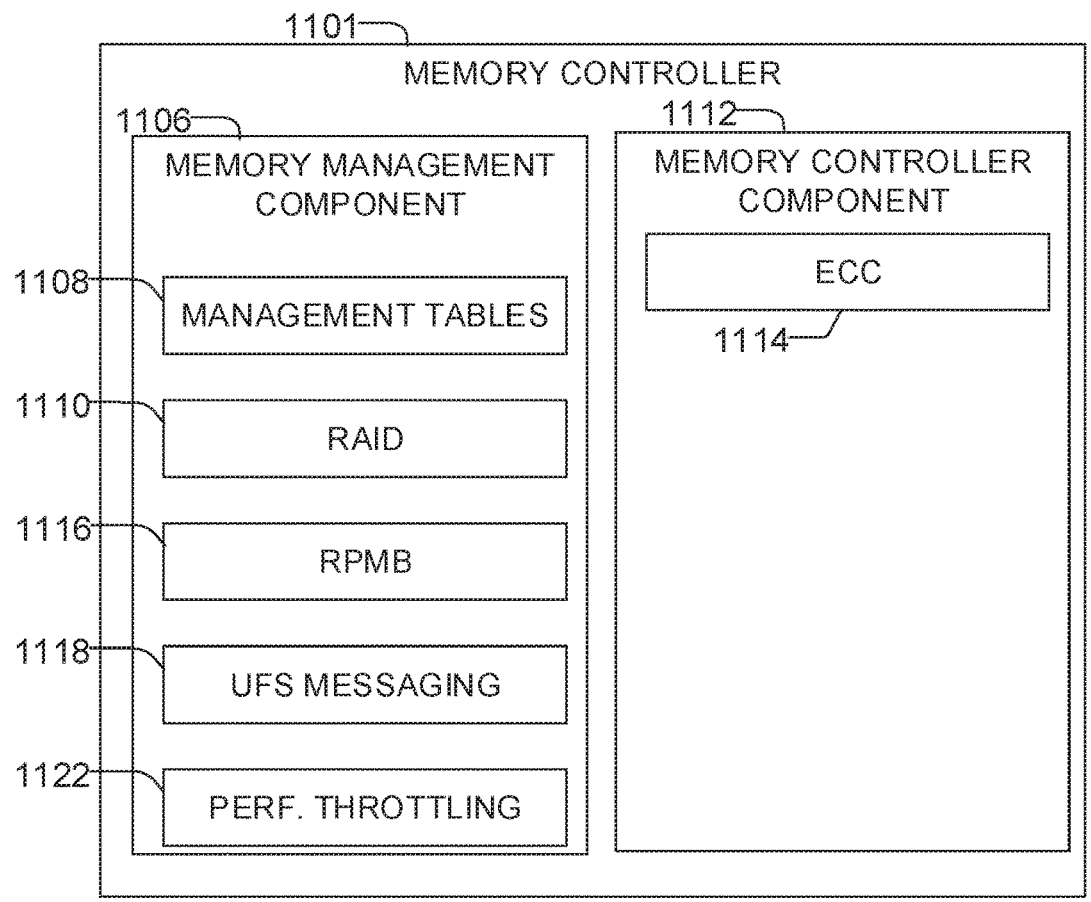
FIG. 11 illustrates an example block diagram of a memory controller according to some examples of the present disclosure.

FIG. 11 illustrates an example block diagram of a memory controller 1101 including a memory management component 1106 and a memory controller component 1112. Memory management component 1106 can be an example of, or include memory controller 1001 and/or device level manager 150 of FIG. 1.

The memory management component 1106 can include, among other things, circuitry or firmware, such as a number of components or integrated circuits associated with various memory management functions, including wear leveling (e.g., garbage collection or reclamation), error detection or correction, block retirement, or one or more other memory management functions. The memory management component 1106 can parse or format host commands (e.g., commands received from a host) into device commands (e.g., commands associated with operation of a memory array, etc.), or generate device commands (e.g., to accomplish various memory management functions) for the memory controller component 1112 or one or more other components of a memory device.

The memory management component 1106 can include management tables 1108 configured to maintain various information associated with one or more component of the memory device (e.g., various information associated with a memory array or one or more memory cells coupled to the memory controller 1101). For example, the management tables 1108 can include information regarding block age, block erase count, error history, or one or more error counts (e.g., a write operation error count, a read bit error count, a read operation error count, an erase error count, etc.) for one or more blocks of memory cells coupled to the memory controller 1101. In certain examples, if the number of detected errors for one or more of the error counts is above a threshold, the bit error can be referred to as an uncorrectable bit error. The management tables 11008 can maintain a count of correctable or uncorrectable bit errors, among other things.

The memory management component 1106 can include a redundant array of independent disks (RAID) unit 1110 (the term "disks" is a carryover from prior implementations using had disk drives, and does not require that the RAID unit 1110 include a physical disk). The RAID unit 1110 can provide data reliability through, among other things, redundant memory operations.

The memory management component 1106 can include a RPMB component 1116 that handles requests from the host to: read or write RPMB memory; program the authentication key; read the write counter; handle result requests, and other functions. The RPMB component 1116 authenticates requests against the authentication key. The RPMB component 1116 may also store the results of the requests into one or more registers, including storing the IID and including the HD in results returned to the host. For example, RPMB component 1116 may implement the flow chart of FIG. 21.

The memory management component 1106 can include a UFS messaging component 1118. For example, the UFS messaging component 1118 may handle the UFS messages, for example, by implementing the UFS interconnect 145. UFS messaging component can send and receive one or more request and/or response UPIUs and other messages over the UFS interface. UFS messaging component 1118 may access UFS descriptors (not shown for clarity, but shown in FIG. 1 as 155) when requested and send back a reply with a value of the UFS descriptors. For example, UFS messaging component 1118 may implement FIG. 18. In some examples, UFS messaging component 1118 may set one or more values in the UFS descriptors as requested by the host.

The memory management component 1106 can include a performance throttling component 1122. Performance throttling component 1122 may detect when a performance throttling event has occurred and may set one or more indicators accordingly. For example, performance throttling component 1122 can set a bit in a wExceptionEventStatus descriptor. UFS messaging component 1118 may then activate an alert flag in a UFS message if a corresponding bit is set in the wExceptionControl flag. Performance throttling component 1122 can implement one or more performance throttling actions that throttle performance of the memory device. Performance throttling component 1122, in conjunction with UFS messaging component 1118 can implement the flowchart of FIG. 15.

The memory control component 1112 can include, among other things, circuitry or components configured to control memory operations associated with writing data to, reading data from, or erasing one or more memory cells of a memory device coupled to the memory controller 1101. The memory operations can be based on, for example, host commands received from a host, or internally generated by the memory management component 1106 or the memory control component 1112 (e.g., in association with wear leveling, error detection or correction, etc.).

The memory controller component 1112 can include an error correction code (ECC) component 1114, which can include, among other things, an ECC engine or other circuitry configured to detect or correct errors associated with writing data to or reading data from one or more memory cells of a memory device coupled to the memory controller 1101. The memory controller 1101 can be configured to actively detect and recover from error occurrences (e.g., bit errors, operation errors, etc.) associated with various operations or storage of data, while maintaining integrity of the data transferred between a host and a memory device, or maintaining integrity of stored data (e.g., using redundant RAID storage in the RAID unit 1110, etc.), and can remove (e.g., retire) failing memory resources (e.g., memory cells, memory arrays, pages, blocks, etc.) to prevent future errors.

Figure 12:
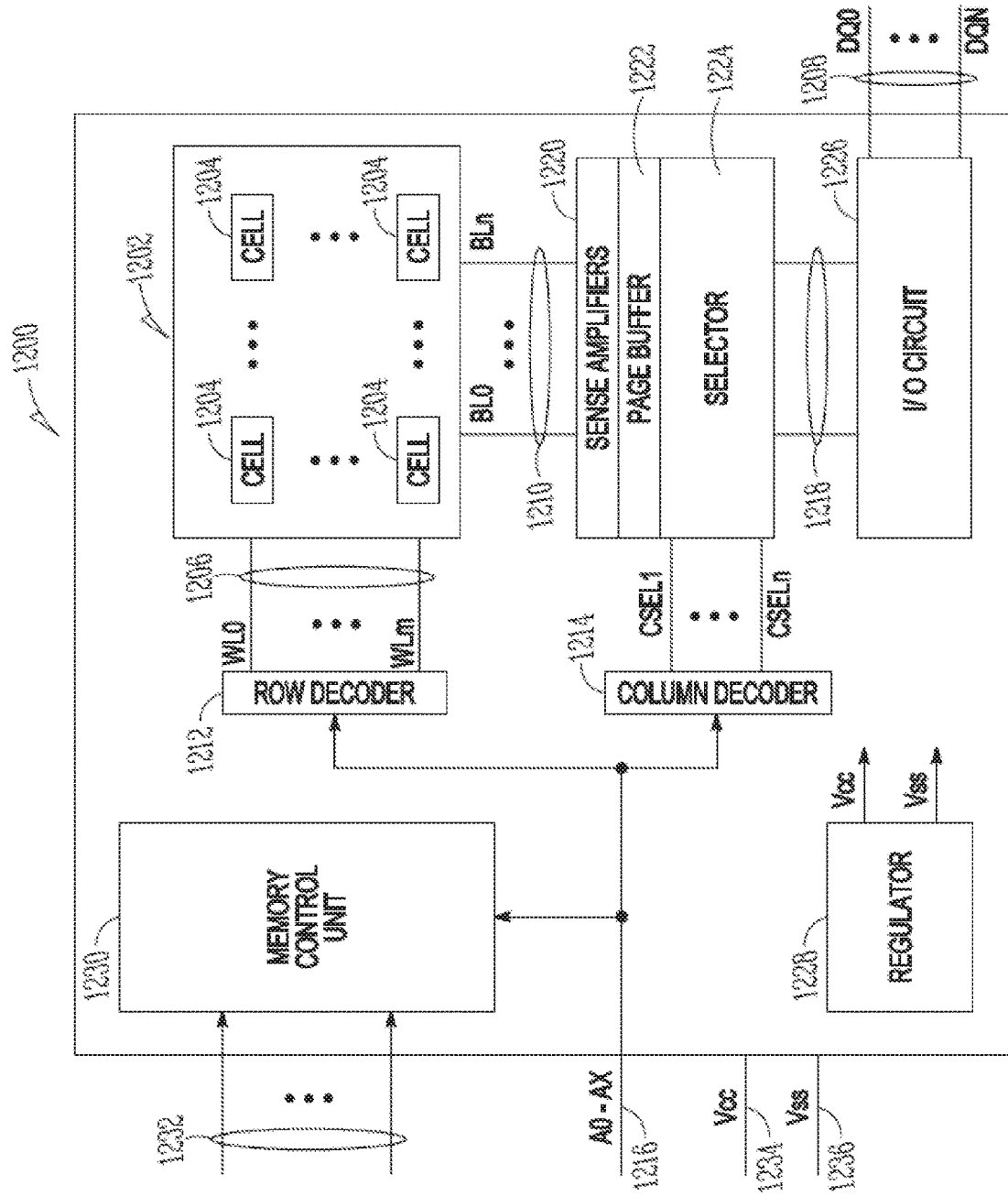
FIG. 12 illustrates an example block diagram of a memory device according to some examples of the present disclosure.

FIG. 12 illustrates an example block diagram of a memory device 1200 including a memory array 1202 having a plurality of memory cells 1204, and one or more circuits or components to provide communication with, or perform one or more memory operations on, the memory array 1202. The memory device 1200 can include a row decoder 1212, a column decoder 1214, sense amplifiers 1220, a page buffer 1222, a selector 1224, an input/output (I/O) circuit 1226, and a memory control unit 1230. The memory cells 1204 of the memory array 1202 can be arranged in rows, columns, pages, and blocks, and can be accessed using, for example, access lines 1206, first data lines 1210, or one or more select gates, etc.

The memory control unit 1230 can control memory operations of the memory device 1200 according to one or more signals or instructions received on control lines 1232, including, for example, one or more clock signals or control signals that indicate a desired operation (e.g., write, read, erase, etc.), or address signals (A0-AX) received on an address line 1216. One or more devices external to the memory device 1200 can control the values of the control signals on the control lines 1232, or the address signals on the address line 1216. Examples of devices external to the memory device 1200 can include, but are not limited to, a host, a memory controller, a processor, or one or more circuits or components not illustrated in FIG. 12.

The memory device 1200 can use access lines 1206 and first data lines 1210 to transfer data to (e.g., write or erase) or from (e.g., read) one or more of the memory cells 1204. The row decoder 1212 and the column decoder 1214 can receive and decode the address signals (A0-AX) from the address line 1216, can determine which of the memory cells 1204 are to be accessed, and can provide signals to one or more of the access lines 1206 (e.g., one or more of a plurality of word lines (WL0-WLm)) or the first data lines 1210 (e.g., one or more of a plurality of bit lines (BL0-BLn)), such as described above.

The memory device 1200 can include sense circuitry, such as the sense amplifiers 1220, configured to determine the values of data on (e.g., read), or to determine the values of data to be written to, the memory cells 1204 using the first data lines 1210. For example, in a selected string of memory cells, one or more of the sense amplifiers 1220 can read a logic level in the selected memory cell in response to a read current flowing in the memory array through the selected string to the data lines 1210.

One or more devices external to the memory device 1200 can communicate with the memory device 1200 using the I/O lines (DQ0-DQN) 1208, address lines 1216 (A0-AX), or control lines 1232. The input/output (I/O) circuit 1226 can transfer values of data in or out of the memory device 1200, such as in or out of the page buffer 1222 or the memory array 1202, using the I/O lines 1208, according to, for example, the control lines 1232 and address lines 1216. The page buffer 1222 can store data received from the one or more devices external to the memory device 1200 before the data is programmed into relevant portions of the memory array 1202, or can store data read from the memory array 1202 before the data is transmitted to the one or more devices external to the memory device 1200.

The column decoder 1214 can receive and decode address signals (A0-AX) into one or more column address signals (CSEL1-CSELn). The selector 1224 (e.g., a select circuit) can receive the column select signals and select data in the page buffer 1222 representing values of data to be read from or to be programmed into memory cells 1204. Selected data can be transferred between the page buffer 1222 and the I/O circuit 1226 using second data lines 1218.

The memory control unit 1230 can receive positive and negative supply signals, such as a supply voltage (Vcc) 1234 and a negative supply (Vss) 1236 (e.g., a ground potential), from an external source or supply (e.g., an internal or external battery, an AC-to-DC converter, etc.). In certain examples, the memory control unit 1230 can include a regulator 1228 to internally provide positive or negative supply signals.

Storage Device

Figure 13:
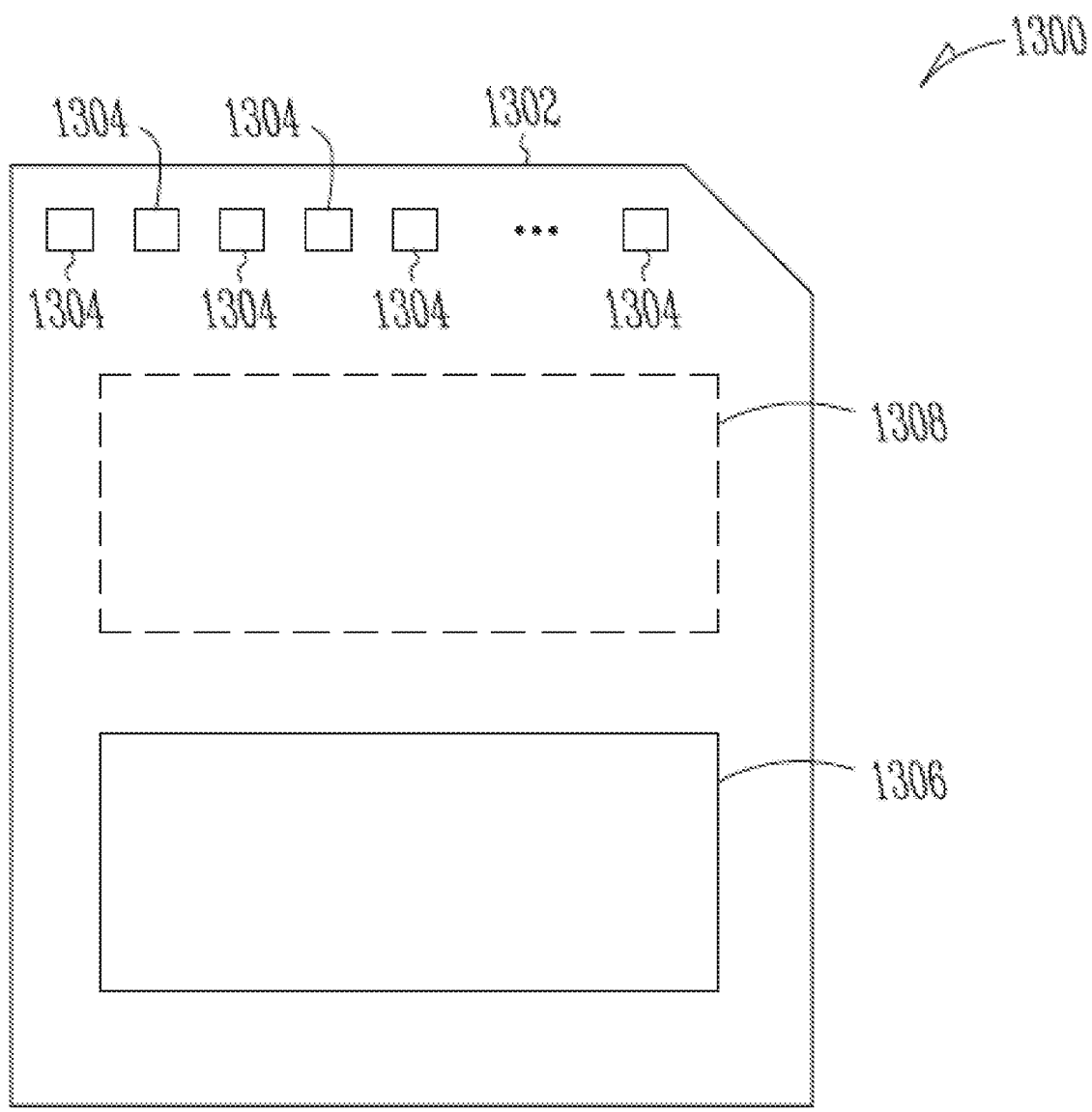
FIG. 13 illustrates an example block diagram of a memory component according to some examples of the present disclosure.

FIG. 13 illustrates an example block diagram of a memory module 1300 (e.g., a memory card) according to various embodiments, including one or more memory devices 1306 (e.g., such as disclosed herein), and optional circuitry 1308. Although illustrated in this example as a memory card, in other examples, the memory module 1300 can include one or more other types of memory module, such as a universal serial bus (USB) flash drive, a solid state drive (SSD), etc.

In certain examples, the memory module 1300 can include a housing 1302 configured to store the one or more memory devices 1306, and a plurality of contacts 1304. The plurality of contacts 1304 can be in the form of one or more standard interfaces (e.g., USB, CompactFlash™, Memory Stick™, UFS CARD, SD Secure Digital™, etc.), and can provide access to one or more memory devices 1306 of the memory module 1300 to one or more host devices according to a standard. For certain applications, the housing 1302 is not required.

The optional circuitry 1308 can include one or more circuits, discrete components, controllers, or processors with firmware configured to assist in accessing or managing the one or more memory devices 1306, as desired.

System Components

FIG. 14 illustrates an example block diagram of an information handling system 1400 incorporating at least one chip or chip assembly 1404 that includes a memory device 1407 according to an embodiment of the invention. In an example, the memory device 1407 can include a plurality of stacked arrays of memory cell strings.

The information handling system 1400 illustrated in FIG. 14 can include an electronic computing device, such as a desktop or laptop computer, a tablet computer, a mobile electronic device or smart phone, a gaming console, a vehicle or aircraft, or one or more other electronic device or electronic device components.

The information handling system 1400 includes a system bus 1402 configured to provide communication across various components of the information handling system 1400. The system bus 1402 can be implemented as a single bus, or as a combination of busses.

The chip assembly 1404 can include a processor 1406, one or more additional logic chips 1408, or one or more other components. The one or more additional logic chips 1408 can include, among other things, an analog-to-digital converter (ADC), or one or more other circuits, such as an application-specific integrated circuit (ASIC), etc.

The information handling system 1400 can include one or more external components 1411, such as external memory, which in turn, can include a modular memory 1412, such as one or more hard drives, etc., or one or more removable media 1413 or removable peripherals 1415, such as compact disks (CDs), digital video disks (DVDs), flash drives, and the like. In certain examples, one or more of the memory devices described herein can be one or more the external components 1411.

The information handling system 1400 can also include a display 1409, a keyboard/controller 1414 (e.g., a mouse, touch screen, touch pad, or other user input device), or one or more other peripheral components 1410 (e.g., speakers, microphones, cameras, etc.).

FIG. 17 illustrates a block diagram of an example machine 1700 upon which any one or more of the techniques (e.g., methodologies) discussed herein may perform. Machine may be another example of information handling system 1400. In alternative embodiments, the machine 1700 may operate as a standalone device or may be connected (e.g., networked) to other machines. Components of machine 1700 may be present in a memory device (e.g., a processor, RAM, storage, a bus, etc. . . . ). Machine 1700 may implement UFS host 110. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a computing device such as a personal computer (PC), a tablet PC, a set-top box (STB), a personal digital assistant (PDA), a mobile telephone, a server implementing a fraud detection service, a smart phone, a web appliance, a network router, an access point, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1724 may further be transmitted or received over a communications network 1726 using a transmission medium via the network interface device 1720. The Machine 1700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. In some examples, the network interface device 1720 may wirelessly communicate using Multiple User MIMO techniques.

Additional Notes

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Other Notes and Examples

Example 1 is a method implemented on a host, the method comprising: sending by an initiator executing on the host, over a host interface to a memory device, an access request for a protected memory region of a non-volatile memory array, the request including an identifier of the initiator, the protected memory region requiring a secret value derived from a key and a write counter to write to the protected memory region; receiving a result through the host interface; determining that the result includes, a second identifier different from the identifier of the initiator; and responsive to determining that the result includes the second identifier, determining that the result is not responsive to the access request.

In Example 2, the subject matter of Example 1 includes, responsive to determining that the result is not responsive to the access request, sending another access request.

In Example 3, the subject matter of Examples 1-2 includes, wherein the result includes a write counter status and an operation status.

In Example 4, the subject matter of Example 3 includes, wherein the write counter status is located in a first region of the result, the operation status is located in a second region of the result, and the identifier of the initiator is located in a third region of the result.

In Example 5, the subject matter of Examples 1-4 includes, wherein the protected memory region is a Replay Protected Memory Block (RPMB).

In Example 6, the subject matter of Examples 1-5 includes, wherein the host interface is a Universal Flash Storage (UFS) interface.

Example 7 is a machine-readable medium storing instructions, which when executed by a host machine, cause the machine to perform operations comprising: sending by an initiator executing on the host, over a host interface to a memory device, an access request for a protected memory region of a non-volatile memory array, the request including an identifier of the initiator, the protected memory region requiring a secret value derived from a key and a write counter to write to the protected memory region; receiving a result through the host interface; determining that the result includes, a second identifier different from the identifier of the initiator; and responsive to determining that the result includes the second identifier, determining that the result is not responsive to the access request.

In Example 8, the subject matter of Example 7 includes, responsive to determining that the result is not responsive to the access request, sending another access request.

In Example 9, the subject matter of Examples 7-8 includes, wherein the result includes a write counter status and an operation status.

In Example 10, the subject matter of Example 9 includes, wherein the write counter status is located in a first region of the result, the operation status is located in a second region of the result, and the identifier of the initiator is located in a third region of the result.

In Example 11, the subject matter of Examples 7-10 includes, wherein the protected memory region is a Replay Protected Memory Block (RPMB).

In Example 12, the subject matter of Examples 7-11 includes, wherein the host interface is a Universal Flash Storage (UFS) interface.

Example 13 is a host computing device comprising: one or more hardware processors; a memory, the memory storing instructions, which when executed by the one or more hardware processors, cause the one or more hardware processors to perform operations comprising: sending by an initiator executing on the host, over a host interface to a memory device, an access request for a protected memory region of a non-volatile memory array, the request including an identifier of the initiator, the protected memory region requiring a secret value derived from a key and a write counter to write to the protected memory region; receiving a result through the host interface; determining that the result includes, a second identifier different from the identifier of the initiator; and responsive to determining that the result includes the second identifier, determining that the result is not responsive to the access request.

In Example 14, the subject matter of Example 13 includes, responsive to determining that the result is not responsive to the access request, sending another access request.

In Example 15, the subject matter of Examples 13-14 includes, wherein the result includes a write counter status and an operation status.

In Example 16, the subject matter of Example 15 includes, wherein the write counter status is located in a first region of the result, the operation status is located in a second region of the result, and the identifier of the initiator is located in a third region of the result.

In Example 17, the subject matter of Examples 13-16 includes, wherein the protected memory region is a Replay Protected Memory Block (RPMB).

In Example 18, the subject matter of Examples 13-17 includes, wherein the host interface is a Universal Flash Storage (UFS) interface.

Example 19 is a host device comprising: means for sending by an initiator executing on the host, over a host interface to a memory device, an access request for a protected memory region of a non-volatile memory array, the request including an identifier of the initiator, the protected memory region requiring a secret value derived from a key and a write counter to write to the protected memory region; means for receiving a result through the host interface; means for determining that the result includes, a second identifier different from the identifier of the initiator; and means for responsive to determining that the result includes the second identifier, determining that the result is not responsive to the access request.

In Example 20, the subject matter of Example 19 includes, responsive to determining that the result is not responsive to the access request, means for sending another access request.

In Example 21, the subject matter of Examples 19-20 includes, wherein the result includes a write counter status and an operation status.

In Example 22, the subject matter of Example 21 includes, wherein the write counter status is located in a first region of the result, the operation status is located in a second region of the result, and the identifier of the initiator is located in a third region of the result.

In Example 23, the subject matter of Examples 19-22 includes, wherein the protected memory region is a Replay Protected Memory Block (RPMB).

In Example 24, the subject matter of Examples 19-23 includes, wherein the host interface is a Universal Flash Storage (UFS) interface.

Example 25 is a method implemented by a memory controller, the method comprising: receiving, over a host interface from a host, an access request for a protected memory region of a non-volatile memory array, the request including an identifier of a source of the request, the protected memory region requiring a secret value derived from a key and a write counter to write to the protected memory region; setting a portion of a result register to the identifier of the source; accessing the protected region of the non-volatile memory array; and placing the result of the protected region access in the result register along with the identifier of the source.

In Example 26, the subject matter of Example 25 includes, wherein the protected memory region is a Replay Protected Memory Block (RPMB).

In Example 27, the subject matter of Examples 25-26 includes, wherein the result register comprises a write counter status and an operation status.

In Example 28, the subject matter of Example 27 includes, wherein the write counter status is placed in a first region of the result register, the operation status is placed in a second region of the result register, and the identifier of the source is placed in a third region of the result register.

In Example 29, the subject matter of Examples 25-28 includes, receiving, over the host interface from a second source on the host, a second access request for the replay protected memory block (RPMB) region, the request from a second source having a second identifier of the second source; setting the portion of the result register to the second identifier; accessing the protected region of the non-volatile memory array; placing the result of the protected region access in the result register along with the second identifier.

In Example 30, the subject matter of Example 29 includes, receiving a result request from the source subsequent to the setting of the portion of the result register to the second identifier; providing the contents of the result register with the second identifier to the source, the source performing error handling in response to detecting that the result register contains the second identifier.

In Example 31, the subject matter of Examples 25-30 includes, wherein the portion of the result register is a response message type register of the result register.

Example 32 is a machine-readable medium storing instructions, which when executed by a memory controller, cause the memory controller to perform operations comprising: receiving, over a host interface from a host, an access request for a protected memory region of a non-volatile memory array, the request including an identifier of a source of the request, the protected memory region requiring a secret value derived from a key and a write counter to write to the protected memory region; setting a portion of a result register to the identifier of the source; accessing the protected region of the non-volatile memory array; and placing the result of the protected region access in the result register along with the identifier of the source.

In Example 33, the subject matter of Example 32 includes, wherein the protected memory region is a Replay Protected Memory Block (RPMB).

In Example 34, the subject matter of Examples 32-33 includes, wherein the result register comprises a write counter status and an operation status.

In Example 35, the subject matter of Example 34 includes, wherein the write counter status is placed in a first region of the result register, the operation status is placed in a second region of the result register, and the identifier of the source is placed in a third region of the result register.

In Example 36, the subject matter of Examples 32-35 includes, wherein the operations further comprise: receiving, over the host interface from a second source on the host, a second access request for the replay protected memory block (RPMB) region, the request from a second source having a second identifier of the second source; setting the portion of the result register to the second identifier; accessing the protected region of the non-volatile memory array; placing the result of the protected region access in the result register along with the second identifier.

In Example 37, the subject matter of Example 36 includes, wherein the operations further comprise: receiving a result request from the source subsequent to the setting of the portion of the result register to the second identifier; providing the contents of the result register with the second identifier to the source, the source performing error handling in response to detecting that the result register contains the second identifier.

In Example 38, the subject matter of Examples 32-37 includes, wherein the portion of the result register is a response message type register of the result register.

Example 39 is a memory device comprising: a non-volatile memory array; a memory controller configured to perform the operations comprising: receiving, over a host interface from a host, an access request for a protected memory region of the non-volatile memory array, the request including an identifier of a source of the request, the protected memory region requiring a secret value derived from a key and a write counter to write to the protected memory region; setting a portion of a result register to the identifier of the source, the protected memory region requiring a secret value derived from a key and a write counter to write to the protected memory region; accessing the protected region of the non-volatile memory array; and placing the result of the protected region access in the result register along with the identifier of the source.

In Example 40, the subject matter of Example 39 includes, wherein the protected memory region is a Replay Protected Memory Block (RPMB).

In Example 41, the subject matter of Examples 39-40 includes, wherein the result register comprises a write counter status and an operation status.

In Example 42, the subject matter of Example 41 includes, wherein the write counter status is placed in a first region of the result register, the operation status is placed in a second region of the result register, and the identifier of the source is placed in a third region of the result register.

In Example 43, the subject matter of Examples 39-42 includes, wherein the controller is further configured to perform the operations of: receiving, over the host interface from a second source on the host, a second access request for the replay protected memory block (RPMB) region, the request from a second source having a second identifier of the second source; setting the portion of the result register to the second identifier; accessing the protected region of the non-volatile memory array; placing the result of the protected region access in the result register along with the second identifier.

In Example 44, the subject matter of Example 43 includes, wherein the controller is further configured to perform the operations of: receiving an access request from the source subsequent to the setting of the portion of the result register to the second identifier; providing the contents of the result register with the second identifier to the source, the source performing error handling in response to detecting that the result register contains the second identifier.

In Example 45, the subject matter of Examples 39-44 includes, wherein the portion of the result register is a response message type register of the result register.

Example 46 is a memory device comprising: means for receiving, over a host interface from a host, an access request for a protected memory region of a non-volatile memory array, the request including an identifier of a source of the request, the protected memory region requiring a secret value derived from a key and a write counter to write to the protected memory region; means for setting a portion of a result register to the identifier of the source; means for accessing the protected region of the non-volatile memory array; and means for placing the result of the protected region access in the result register along with the identifier of the source.

In Example 47, the subject matter of Example 46 includes, wherein the protected memory region is a Replay Protected Memory Block (RPMB).

In Example 48, the subject matter of Examples 46-47 includes, wherein the result register comprises a write counter status and an operation status.

In Example 49, the subject matter of Example 48 includes, wherein the write counter status is placed in a first region of the result register, the operation status is placed in a second region of the result register, and the identifier of the source is placed in a third region of the result register.

In Example 50, the subject matter of Examples 46-49 includes, means for receiving, over the host interface from a second source on the host, a second access request for the replay protected memory block (RPMB) region, the request from a second source having a second identifier of the second source; means for setting the portion of the result register to the second identifier; means for accessing the protected region of the non-volatile memory array; and means for placing the result of the protected region access in the result register along with the second identifier.

In Example 51, the subject matter of Example 50 includes, means for receiving an access request from the source subsequent to the setting of the portion of the result register to the second identifier; and means for providing the contents of the result register with the second identifier to the source, the source performing error handling in response to detecting that the result register contains the second identifier.

In Example 52, the subject matter of Examples 46-51 includes, wherein the portion of the result register is a response message type register of the result register.

Example 53 is a method implemented by a memory controller of a memory device, the method comprising: receiving, from a host device over a host interface, a request for a device descriptor of a memory device; and sending to the host, over the host interface, the device descriptor, the device descriptor including voltage supply capability fields that are set to indicate supported voltages of the memory device, the supported voltages selected from a plurality of discrete voltages, and wherein the host device utilizes the supported voltages to supply an appropriate voltage to the memory device.

In Example 54, the subject matter of Example 53 includes, wherein the voltage supply capability fields includes a VCC voltage capability field.

In Example 55, the subject matter of Examples 53-54 includes, wherein the voltage supply capability fields includes a VCCQ voltage capability field.

In Example 56, the subject matter of Examples 53-55 includes, wherein the voltage supply capability fields includes a VCCQ2 voltage capability field.

In Example 57, the subject matter of Examples 53-56 includes, wherein the voltage supply capability fields indicates that the memory device is compliant with Universal Flash Storage (UFS) version 2.1 voltage levels.

In Example 58, the subject matter of Examples 53-57 includes, wherein the voltage supply capability fields indicates that the memory device is compliant with Universal Flash Storage (UFS) version 3.0 voltage levels.

Example 59 is a memory device comprising: an array of memory cells; a controller, configured to perform operations comprising: receiving, from a host device over a host interface, a request for a device descriptor of a memory device; and sending to the host, over the host interface, the device descriptor, the device descriptor including voltage supply capability fields that are set to indicate supported voltages of the memory device, the supported voltages selected from a plurality of discrete voltages, and wherein the host device utilizes the supported voltages to supply an appropriate voltage to the memory device.

In Example 60, the subject matter of Example 59 includes, wherein the voltage supply capability fields includes a VCC voltage capability field.

In Example 61, the subject matter of Examples 59-60 includes, wherein the voltage supply capability fields includes a VCCQ voltage capability field.

In Example 62, the subject matter of Examples 59-61 includes, wherein the voltage supply capability fields includes a VCCQ2 voltage capability field.

In Example 63, the subject matter of Examples 59-62 includes, wherein the voltage supply capability fields indicates that the memory device is compliant with Universal Flash Storage (UFS) version 2.1 voltage levels.

In Example 64, the subject matter of Examples 59-63 includes, wherein the voltage supply capability fields indicates that the memory device is compliant with Universal Flash Storage (UFS) version 3.0 voltage levels.

Example 65 is a machine-readable medium, storing instructions, which when executed by a memory device, cause the memory device to perform operations comprising: receiving, from a host device over a host interface, a request for a device descriptor of a memory device; and sending to the host, over the host interface, the device descriptor, the device descriptor including voltage supply capability fields that are set to indicate supported voltages of the memory device, the supported voltages selected from a plurality of discrete voltages, and wherein the host device utilizes the supported voltages to supply an appropriate voltage to the memory device.

In Example 66, the subject matter of Example 65 includes, wherein the voltage supply capability fields includes a VCC voltage capability field.

In Example 67, the subject matter of Examples 65-66 includes, wherein the voltage supply capability fields includes a VCCQ voltage capability field.

In Example 68, the subject matter of Examples 65-67 includes, wherein the voltage supply capability fields includes a VCCQ2 voltage capability field.

In Example 69, the subject matter of Examples 65-68 includes, wherein the voltage supply capability fields indicates that the memory device is compliant with Universal Flash Storage (UFS) version 2.1 voltage levels.

In Example 70, the subject matter of Examples 65-69 includes, wherein the voltage supply capability fields indicates that the memory device is compliant with Universal Flash Storage (UFS) version 3.0 voltage levels.

Example 71 is a memory device comprising: means for receiving, from a host device over a host interface, a request for a device descriptor of a memory device; and means for sending to the host, over the host interface, the device descriptor, the device descriptor including voltage supply capability fields that are set to indicate supported voltages of the memory device, the supported voltages selected from a plurality of discrete voltages, and wherein the host device utilizes the supported voltages to supply an appropriate voltage to the memory device.

In Example 72, the subject matter of Example 71 includes, wherein the voltage supply capability fields includes a VCC voltage capability field.

In Example 73, the subject matter of Examples 71-72 includes, wherein the voltage supply capability fields includes a VCCQ voltage capability field.

In Example 74, the subject matter of Examples 71-73 includes, wherein the voltage supply capability fields includes a VCCQ2 voltage capability field.

In Example 75, the subject matter of Examples 71-74 includes, wherein the voltage supply capability fields indicates that the memory device is compliant with Universal Flash Storage (UFS) version 2.1 voltage levels.

In Example 76, the subject matter of Examples 71-75 includes, wherein the voltage supply capability fields indicates that the memory device is compliant with Universal Flash Storage (UFS) version 3.0 voltage levels.

Example 77 is a method implemented by a host device, the method comprising: sending to a memory device, over a host interface, a request for a device descriptor of a memory device; and receiving from the memory device, over the host interface, the device descriptor, the device descriptor including voltage supply capability fields that are set to indicate supported voltages of the memory device, the supported voltages one of a plurality of discrete voltages; and causing the supported voltages to be supplied to the memory device.

In Example 78, the subject matter of Example 77 includes, wherein the voltage supply capability fields includes a VCC voltage capability field.

In Example 79, the subject matter of Examples 77-78 includes, wherein the voltage supply capability fields includes a VCCQ voltage capability field.

In Example 80, the subject matter of Examples 77-79 includes, wherein the voltage supply capability fields includes a VCCQ2 voltage capability field.

In Example 81, the subject matter of Examples 77-80 includes, wherein the voltage supply capability fields indicates that the memory device is compliant with Universal Flash Storage (UFS) version 2.1 voltage levels.

In Example 82, the subject matter of Examples 77-81 includes, wherein the voltage supply capability fields indicates that the memory device is compliant with Universal Flash Storage (UFS) version 3.0 voltage levels.

Example 83 is a machine-readable medium, storing instructions, which when executed by a host device, cause the host device to perform operations comprising: sending to a memory device, over a host interface, a request for a device descriptor of a memory device; and receiving from the memory device, over the host interface, the device descriptor, the device descriptor including voltage supply capability fields that are set to indicate supported voltages of the memory device, the supported voltages one of a plurality of discrete voltages; and causing the supported voltages to be supplied to the memory device.

In Example 84, the subject matter of Example 83 includes, wherein the voltage supply capability fields includes a VCC voltage capability field.

In Example 85, the subject matter of Examples 83-84 includes, wherein the voltage supply capability fields includes a VCCQ voltage capability field.

In Example 86, the subject matter of Examples 83-85 includes, wherein the voltage supply capability fields includes a VCCQ2 voltage capability field.

In Example 87, the subject matter of Examples 83-86 includes, wherein the voltage supply capability fields indicates that the memory device is compliant with Universal Flash Storage (UFS) version 2.1 voltage levels.

In Example 88, the subject matter of Examples 83-87 includes, wherein the voltage supply capability fields indicates that the memory device is compliant with Universal Flash Storage (UFS) version 3.0 voltage levels.

Example 89 is a host computing device comprising: one or more processors; a memory, storing instructions, which when executed by the one or more processors, cause the one or more processors to perform operations comprising: sending to a memory device, over a host interface, a request for a device descriptor of a memory device; and receiving from the memory device, over the host interface, the device descriptor, the device descriptor including voltage supply capability fields that are set to indicate supported voltages of the memory device, the supported voltages one of a plurality of discrete voltages; and causing the supported voltages to be supplied to the memory device.

In Example 90, the subject matter of Example 89 includes, wherein the voltage supply capability fields includes a VCC voltage capability field.

In Example 91, the subject matter of Examples 89-90 includes, wherein the voltage supply capability fields includes a VCCQ voltage capability field.

In Example 92, the subject matter of Examples 89-91 includes, wherein the voltage supply capability fields includes a VCCQ2 voltage capability field.

In Example 93, the subject matter of Examples 89-92 includes, wherein the voltage supply capability fields indicates that the memory device is compliant with Universal Flash Storage (UFS) version 2.1 voltage levels.

In Example 94, the subject matter of Examples 89-93 includes, wherein the voltage supply capability fields indicates that the memory device is compliant with Universal Flash Storage (UFS) version 3.0 voltage levels.

Example 95 is a host device comprising: means for sending to a memory device, over a host interface, a request for a device descriptor of a memory device; and means for receiving from the memory device, over the host interface, the device descriptor, the device descriptor including voltage supply capability fields that are set to indicate supported voltages of the memory device, the supported voltages one of a plurality of discrete voltages; and means for causing the supported voltages to be supplied to the memory device.

In Example 96, the subject matter of Example 95 includes, wherein the voltage supply capability fields includes a VCC voltage capability field.

In Example 97, the subject matter of Examples 95-96 includes, wherein the voltage supply capability fields includes a VCCQ voltage capability field.

In Example 98, the subject matter of Examples 95-97 includes, wherein the voltage supply capability fields includes a VCCQ2 voltage capability field.

In Example 99, the subject matter of Examples 95-98 includes, wherein the voltage supply capability fields indicates that the memory device is compliant with Universal Flash Storage (UFS) version 2.1 voltage levels.

In Example 100, the subject matter of Examples 95-99 includes, wherein the voltage supply capability fields indicates that the memory device is compliant with Universal Flash Storage (UFS) version 3.0 voltage levels.

Example 101 is a method of performance throttling at a memory device, the method comprising: determining that a condition has occurred that indicates a performance throttling operation; implementing a performance throttling responsive to the determined condition; responsive to implementing the performance throttling, setting a performance throttling status indicator in an exception event status attribute; receiving a command from a host device across a memory device interface; performing the command; preparing a response to the command, the response including a flag indicating that the performance throttling status indicator is set in the exception event status attribute; and sending the response to the host device.

In Example 102, the subject matter of Example 101 includes, wherein the response is formatted as a Universal Flash Storage Protocol Information Unit (UPIU) message.

In Example 103, the subject matter of Examples 101-102 includes, wherein the host device and the memory device communicate using a Universal Flash Storage family of standards.

In Example 104, the subject matter of Examples 101-103 includes, setting a throttling status attribute to a value indicating the condition.

In Example 105, the subject matter of Examples 101-104 includes, wherein including the flag indicating that the performance throttling status indicator is set comprises determining that a control attribute has an indicator set corresponding to the performance throttling status indicator, the indicator in the control attribute set by the host.

In Example 106, the subject matter of Examples 101-105 includes, wherein the condition is a temperature reading of a temperature sensor of the memory device transgressing a threshold.

In Example 107, the subject matter of Examples 101-106 includes, wherein the performance throttling comprises: reducing a number of parallel accesses to memory cells of the memory device or reducing a speed at which the memory cells are accessed.

Example 108 is a machine-readable medium, storing instructions, which when executed by a memory device, causes the memory device to perform operations comprising: determining that a condition has occurred that indicates a performance throttling operation; implementing a performance throttling responsive to the determined condition; responsive to implementing the performance throttling, setting a performance throttling status indicator in an exception event status attribute; receiving a command from a host device across a memory device interface; performing the command; preparing a response to the command, the response including a flag indicating that the performance throttling status indicator is set in the exception event status attribute; and sending the response to the host device.

In Example 109, the subject matter of Example 108 includes, wherein the response is formatted as a Universal Flash Storage Protocol Information Unit (UPIU) message.

In Example 110, the subject matter of Examples 108-109 includes, wherein the host device and the memory device communicate using a Universal Flash Storage family of standards.

In Example 111, the subject matter of Examples 108-110 includes, wherein the instructions further comprise: setting a throttling status attribute to a value indicating the condition.

In Example 112, the subject matter of Examples 108-111 includes, wherein the operations of including the flag indicating that the performance throttling status indicator is set comprises determining that a control attribute has an indicator set corresponding to the performance throttling status indicator, the indicator in the control attribute set by the host.

In Example 113, the subject matter of Examples 108-112 includes, wherein the condition is a temperature reading of a temperature sensor of the memory device transgressing a threshold.

In Example 114, the subject matter of Examples 108-113 includes, wherein the performance throttling comprises: reducing a number of parallel accesses to memory cells of the memory device or reducing a speed at which the memory cells are accessed.

Example 115 is a memory device comprising: a non-volatile memory array; a memory controller configured to perform the operations comprising: determining that a condition has occurred that indicates a performance throttling operation; implementing a performance throttling responsive to the determined condition; responsive to implementing the performance throttling, setting a performance throttling status indicator in an exception event status attribute; receiving a command from a host device across a memory device interface; performing the command; preparing a response to the command, the response including a flag indicating that the performance throttling status indicator is set in the exception event status attribute; and sending the response to the host device.

In Example 116, the subject matter of Example 115 includes, wherein the response is formatted as a Universal Flash Storage Protocol Information Unit (UPIU) message.

In Example 117, the subject matter of Examples 115-116 includes, wherein the host device and the memory device communicate using a Universal Flash Storage family of standards.

In Example 118, the subject matter of Examples 115-117 includes, wherein the controller is further configured to perform the operations of: setting a throttling status attribute to a value indicating the condition.

In Example 119, the subject matter of Examples 115-118 includes, wherein the operations of including the flag indicating that the performance throttling status indicator is set comprises determining that a control attribute has an indicator set corresponding to the performance throttling status indicator, the indicator in the control attribute set by the host.

In Example 120, the subject matter of Examples 115-119 includes, wherein the condition is a temperature reading of a temperature sensor of the memory device transgressing a threshold.

In Example 121, the subject matter of Examples 115-120 includes, wherein the performance throttling comprises: reducing a number of parallel accesses to memory cells of the memory device or reducing a speed at which the memory cells are accessed.

Example 122 is a memory device comprising: means for determining that a condition has occurred that indicates a performance throttling operation; means for implementing a performance throttling responsive to the determined condition; means for responsive to implementing the performance throttling, setting a performance throttling status indicator in an exception event status attribute; means for receiving a command from a host device across a memory device interface; means for performing the command; means for preparing a response to the command, the response including a flag indicating that the performance throttling status indicator is set in the exception event status attribute; and means for sending the response to the host device.

In Example 123, the subject matter of Example 122 includes, wherein the response is formatted as a Universal Flash Storage Protocol Information Unit (UPIU) message.

In Example 124, the subject matter of Examples 122-123 includes, wherein the host device and the memory device communicate using a Universal Flash Storage family of standards.

In Example 125, the subject matter of Examples 122-124 includes, means for setting a throttling status attribute to a value indicating the condition.

In Example 126, the subject matter of Examples 122-125 includes, wherein the means for including the flag indicating that the performance throttling status indicator is set comprises means for determining that a control attribute has an indicator set corresponding to the performance throttling status indicator, the indicator in the control attribute set by the host.

In Example 127, the subject matter of Examples 122-126 includes, wherein the condition is a temperature reading of a temperature sensor of the memory device transgressing a threshold.

In Example 128, the subject matter of Examples 122-127 includes, wherein the means for performance throttling comprises: reducing a number of parallel accesses to memory cells of the memory device or reducing a speed at which the memory cells are accessed.

Example 129 is a method of handling a performance throttling of a memory device at a host, the method comprising: sending a command to a memory device across a memory device interface; receiving a response to the command, the response including a flag indicating that an exception event is ongoing; determining that the exception event indicates that a performance throttling is occurring; determining a reason for the performance throttling; and taking an action to reduce the performance throttling.

In Example 130, the subject matter of Example 129 includes, wherein determining that the exception event indicates that the performance throttling is occurring comprises: querying the memory device for an indication that the exception event indicates that the performance throttling is occurring.

In Example 131, the subject matter of Examples 129-130 includes, wherein determining the reason for the performance throttling comprises: querying the memory device for an indication of why the memory device is performance throttling.

In Example 132, the subject matter of Examples 129-131 includes, wherein the reason is a depletion of an SLC cache, and wherein the action to reduce the performance throttling comprises instructing the memory device to reallocate other memory to the SLC cache.

In Example 133, the subject matter of Examples 129-132 includes, wherein the reason is a high temperature, and wherein the action to reduce the performance throttling comprises turning on a fan.

In Example 134, the subject matter of Examples 129-133 includes, wherein the reason is a memory pool of the memory device is low on free space, and wherein the action to reduce the performance throttling comprises instructing the memory device to delete a file stored in the pool.

In Example 135, the subject matter of Examples 129-134 includes, wherein the reason is the memory device is low on free space, and wherein the action to reduce the performance throttling comprises instructing the memory device to delete a file.

Example 136 is a machine-readable medium storing instructions, which when executed by a host machine, cause the machine to perform operations comprising: sending a command to a memory device across a memory device interface; receiving a response to the command, the response including a flag indicating that an exception event is ongoing; determining that the exception event indicates that a performance throttling is occurring; determining a reason for the performance throttling; and taking an action to reduce the performance throttling.

In Example 137, the subject matter of Example 136 includes, wherein the operations of determining that the exception event indicates that the performance throttling is occurring comprises: querying the memory device for an indication that the exception event indicates that the performance throttling is occurring.

In Example 138, the subject matter of Examples 136-137 includes, wherein the operations of determining the reason for the performance throttling comprises: querying the memory device for an indication of why the memory device is performance throttling.

In Example 139, the subject matter of Examples 136-138 includes, wherein the reason is a depletion of an SLC cache, and wherein the action to reduce the performance throttling comprises instructing the memory device to reallocate other memory to the SLC cache.

In Example 140, the subject matter of Examples 136-139 includes, wherein the reason is a high temperature, and wherein the action to reduce the performance throttling comprises turning on a fan.

In Example 141, the subject matter of Examples 136-140 includes, wherein the reason is a memory pool of the memory device is low on free space, and wherein the action to reduce the performance throttling comprises instructing the memory device to delete a file stored in the pool.

In Example 142, the subject matter of Examples 136-141 includes, wherein the reason is the memory device is low on free space, and wherein the action to reduce the performance throttling comprises instructing the memory device to delete a file.

Example 143 is a host computing device comprising: one or more hardware processors; a memory, storing instructions, which when executed by the one or more hardware processors, causes the one or more hardware processors to perform operations comprising: sending a command to a memory device across a memory device interface; receiving a response to the command, the response including a flag indicating that an exception event is ongoing; determining that the exception event indicates that a performance throttling is occurring; determining a reason for the performance throttling; and taking an action to reduce the performance throttling.

In Example 144, the subject matter of Example 143 includes, wherein the operations of determining that the exception event indicates that the performance throttling is occurring comprises: querying the memory device for an indication that the exception event indicates that the performance throttling is occurring.

In Example 145, the subject matter of Examples 143-144 includes, wherein the operations of determining the reason for the performance throttling comprises: querying the memory device for an indication of why the memory device is performance throttling.

In Example 146, the subject matter of Examples 143-145 includes, wherein the reason is a depletion of an SLC cache, and wherein the action to reduce the performance throttling comprises instructing the memory device to reallocate other memory to the SLC cache.

In Example 147, the subject matter of Examples 143-146 includes, wherein the reason is a high temperature, and wherein the action to reduce the performance throttling comprises turning on a fan.

In Example 148, the subject matter of Examples 143-147 includes, wherein the reason is a memory pool of the memory device is low on free space, and wherein the action to reduce the performance throttling comprises instructing the memory device to delete a file stored in the pool.

In Example 149, the subject matter of Examples 143-148 includes, wherein the reason is the memory device is low on free space, and wherein the action to reduce the performance throttling comprises instructing the memory device to delete a file.

Example 150 is a host device comprising: means for sending a command to a memory device across a memory device interface; means for receiving a response to the command, the response including a flag indicating that an exception event is ongoing; means for determining that the exception event indicates that a performance throttling is occurring; means for determining a reason for the performance throttling; and means for taking an action to reduce the performance throttling.

In Example 151, the subject matter of Example 150 includes, wherein the means for determining that the exception event indicates that the performance throttling is occurring comprises: means for querying the memory device for an indication that the exception event indicates that the performance throttling is occurring.

In Example 152, the subject matter of Examples 150-151 includes, wherein the means for determining the reason for the performance throttling comprises: means for querying the memory device for an indication of why the memory device is performance throttling.

In Example 153, the subject matter of Examples 150-152 includes, wherein the reason is a depletion of an SLC cache, and wherein the action to reduce the performance throttling comprises instructing the memory device to reallocate other memory to the SLC cache.

In Example 154, the subject matter of Examples 150-153 includes, wherein the reason is a high temperature, and wherein the action to reduce the performance throttling comprises turning on a fan.

In Example 155, the subject matter of Examples 150-154 includes, wherein the reason is a memory pool of the memory device is low on free space, and wherein the action to reduce the performance throttling comprises instructing the memory device to delete a file stored in the pool.

In Example 156, the subject matter of Examples 150-155 includes, wherein the reason is the memory device is low on free space, and wherein the action to reduce the performance throttling comprises instructing the memory device to delete a file.

Example 157 is at least one machine-readable medium including instructions that, when executed by processing circuitry, cause the processing circuitry to perform operations to implement of any of Examples 1-156.

Example 158 is an apparatus comprising means to implement of any of Examples 1-156.

Example 159 is a system to implement of any of Examples 1-156.

Example 160 is a method to implement of any of Examples 1-156.

What is claimed is:

1. A memory device comprising:
   an array of memory cells;
   a memory controller, configured to perform operations comprising:
   receiving, from a host device over a Universal Flash Storage (UFS) host interface, a request for a device descriptor of a memory device; and
   sending to the host device, over the host interface, the device descriptor, the device descriptor including a voltage supply capability field that is set to indicate supported voltages for at least two different voltage rails of the memory device, the supported voltages selected from a plurality of discrete voltages, wherein the host device utilizes the supported voltages to supply an appropriate voltage for the at least two different voltage rails to the memory device, and wherein the values of the voltage supply capability field indicates whether the memory device is compliant with voltage levels of a UPS version 3.0 standard.

2. The memory device of claim 1, wherein one of the voltage rails is a VCC voltage.

3. The memory device of claim 1, wherein one of the voltage rails is a VCCQ voltage.

4. The memory device of claim 1, wherein one of the voltage rails is a VCCQ2 voltage.

5. A method implemented by a memory controller of a memory device, the method comprising:
   receiving, from a host device over a Universal Flash Storage (UFS) host interface, a request for a device descriptor of a memory device; and
   sending to the host device, over the host interface, the device descriptor, the device descriptor including a voltage supply capability field that is set to indicate supported voltages for at least two different voltage rails of the memory device, the supported voltages selected from a plurality of discrete voltages, wherein the host device utilizes the supported voltages to supply an appropriate voltage for the at least two different voltage rails to the memory device, and wherein the values of the voltage supply capability field indicates whether the memory device is compliant with voltage levels of a UFS version 3.0 standard.

6. The method of claim 5, wherein one of the voltage rails is a VCC voltage.

7. The method of claim 5, wherein one of the voltage rails is a VCCQ voltage.

8. The method of claim 5, wherein one of the voltage rails is a VCCQ2 voltage.

9. A non-transitory machine-readable medium, storing instructions, which when executed by a memory device, cause the memory device to perform operations comprising:
   receiving, from a host device over a Universal Flash Storage (UFS) host interface, a request for a device descriptor of a memory device; and
   sending to the host device, over the host interface, the device descriptor, the device descriptor including a voltage supply capability field that is set to indicate supported voltages for at least two different voltage rails of the memory device, the supported voltages selected from a plurality of discrete voltages, wherein the host device utilizes the supported voltages to supply an appropriate voltage for the at least two different, voltage rails to the memory device, and wherein the values of the voltage supply capability field indicates whether the memory device is compliant with voltage levels of the UFS 3.0 standard.

10. The non-transitory machine-readable medians of claim 9, wherein one of the voltage rails is a VCC voltage.

11. The non-transitory machine-readable medium of claim 9, one of the voltage rails is a VCCQ voltage.

12. The non-transitory machine-readable medium of claim 9, wherein one of the voltage rails is a VCCQ2 voltage.

13. A host computing device comprising:
    one or more processors;
    a memory, storing instructions, which when executed by the one or more processors, cause the one or more processors to perform operations comprising:
    sending to a memory device, over a host interface, a request for a device descriptor of a memory device; and
    receiving from the memory device, over the host interface, the device descriptor including a voltage supply capability field that is set to indicate supported voltages for at least two different voltage rails of the memory device, the supported voltages one of a plurality of discrete voltages, the values of the voltage supply capability field indicates whether the memory device is compliant with voltage levels of a Universal Flash Storage (UFS) version 3.0 standard; and
    causing the supported voltages to be supplied to the memory device.

* * * * *